(12) United States Patent
Cookson et al.

(10) Patent No.: US 10,706,233 B2
(45) Date of Patent: Jul. 7, 2020

(54) SYSTEM AND METHOD FOR EXTRACTING AND UTILIZING INFORMATION FROM DIGITAL COMMUNICATIONS

(71) Applicant: M-Files Oy, Tampere (FI)

(72) Inventors: Trevor Cookson, Fredericton (CA); Jayson deVries, Fredericton (CA); Mostafa Karamibekr, Fredericton (CA); Glenn Owen, Fredericton (CA); Ramanpreet Singh, Fredericton (CA); Christopher Towler, Nasonworth (CA)

(73) Assignee: M-Files Oy (FI)

( * ) Notice: Subject to any disclaimer, the term of this patent is extended or adjusted under 35 U.S.C. 154(b) by 164 days.

(21) Appl. No.: 15/062,454

(22) Filed: Mar. 7, 2016

(65) Prior Publication Data
US 2016/0259778 A1 Sep. 8, 2016

Related U.S. Application Data

(60) Provisional application No. 62/129,527, filed on Mar. 6, 2015.

(51) Int. Cl.
*G06F 40/30* (2020.01)
*G06Q 10/10* (2012.01)
*G06F 40/284* (2020.01)

(52) U.S. Cl.
CPC ............ *G06F 40/30* (2020.01); *G06F 40/284* (2020.01); *G06Q 10/107* (2013.01)

(58) Field of Classification Search
CPC ........... G06F 17/2785; G06F 17/30663; G06F 17/30675; G06F 17/30684; G06F 17/30731; G06F 17/3089; G06F 17/277; G06F 9/44589; G06F 17/30017; G06F 17/30321; G06F 17/30743; G06F 17/30749; G06F 17/30997; G06F 9/468; G06F 11/2097; G06F 15/80; G06F 8/45; G06F 9/3009; G06F 9/30098; G06F 9/3012; G06F 9/3851; G06F 9/3867; G06F 9/3891; G06F 9/45533; G06F 9/46; G06F 17/30867; G06F 9/451; G06F 12/0888; G06F 17/2247; G06F 17/30091; G06F 17/30265; G06F 17/30342; G06F 17/30569; G06F 17/30873; G06F 21/6218; G06F 21/6272; G06F 2201/81; G06F 2212/263; G06F 3/0237;

(Continued)

(56) References Cited

U.S. PATENT DOCUMENTS 7,478,105 B2 * 1/2009 Albornoz ............... G06Q 10/10
8,326,794 B1 * 12/2012 Wood .................. G06F 11/3485
707/600

(Continued)

*Primary Examiner* — Abdelali Serrou
(74) *Attorney, Agent, or Firm* — Ware, Fressola, Maguire & Barber LLP

(57) ABSTRACT

Provided is a computer implemented method including receiving a digital communication; analyzing said communication using natural language processing to identify any semantic reference to one or more digital artifacts; and identifying and locating the one or more digital artifacts. In some embodiments one or more digital artifacts are not specifically identified in the digital communication. In some embodiments one or more digital artifacts are not specifically included in the digital communication. Related apparatus, systems, techniques, and articles are also described.

13 Claims, 34 Drawing Sheets

(58) Field of Classification Search
CPC .......... G06F 8/71; G06F 9/4493; G06F 9/452;
G06F 9/542; G06F 11/3034; G06F
11/3051; G06F 11/3409; G06F 11/3466;
G06F 11/3476; G06F 11/3485; G06F
13/10; G06F 15/17331; G06F 17/2775;
G06F 17/30; G06F 17/30306; G06F
17/30368; G06F 17/30386; G06F
17/30463; G06F 17/30528; G06F
17/30554; G06F 17/30557; G06F
17/30575; G06F 17/30864; G06F
17/3087; G06F 17/30899; G06F
2009/45587; G06F 21/53; G06F 21/566;
G06F 21/577; G06F 21/6281; G06F
2201/80; G06F 2221/033; G06F 3/0605;
G06F 3/0653; G06F 3/067; G06F 8/316;
G06F 8/38; G06F 8/52; G06F 8/61; G06F
9/4411; G06F 9/4448; G06F 9/453; G06F
9/454; G06F 9/45512; G06F 9/45558;
G06F 9/461; G06F 9/4818; G06F 9/4881;
G06F 40/30; G06F 40/284; G06F
17/2778; G06Q 10/07; G06Q 10/107
See application file for complete search history.

(56) References Cited

U.S. PATENT DOCUMENTS

| | | | | |
|---|---|---|---|---|
| 8,380,489 | B1 * | 2/2013 | Zhang | G06F 17/2785 |
| | | | | 704/4 |
| 9,229,738 | B2 * | 1/2016 | Biazetti | G06F 8/316 |
| 9,946,685 | B1 * | 4/2018 | Wood | G06F 16/957 |
| 2002/0042730 | A1 * | 4/2002 | Homer | G06F 21/10 |
| | | | | 715/203 |
| 2006/0100995 | A1 * | 5/2006 | Albornoz | G06F 17/3089 |
| 2007/0236746 | A1 * | 10/2007 | Benedek | G06F 8/20 |
| | | | | 358/3.26 |
| 2008/0091978 | A1 * | 4/2008 | Brodsky | G06F 11/3466 |
| | | | | 714/38.14 |
| 2009/0019356 | A1 * | 1/2009 | Deyab | G06F 40/117 |
| | | | | 715/231 |
| 2009/0037912 | A1 * | 2/2009 | Stoitsev | G06F 9/45512 |
| | | | | 718/100 |
| 2009/0144248 | A1 * | 6/2009 | Treadgold | G06F 40/30 |
| 2011/0270602 | A1 * | 11/2011 | Liu | G06F 9/454 |
| | | | | 704/8 |
| 2012/0110559 | A1 * | 5/2012 | Dolinsky | G06F 8/45 |
| | | | | 717/143 |
| 2013/0108048 | A1 * | 5/2013 | Grube | H04W 12/00 |
| | | | | 380/270 |
| 2013/0138665 | A1 * | 5/2013 | Hu | G06F 17/30731 |
| | | | | 707/749 |
| 2013/0159428 | A1 * | 6/2013 | Soundararajan | G06F 9/45512 |
| | | | | 709/206 |
| 2014/0244242 | A1 * | 8/2014 | Galvin, Jr. | G06F 40/169 |
| | | | | 704/9 |
| 2015/0269145 | A1 * | 9/2015 | Fink | G06F 17/2785 |
| | | | | 715/254 |
| 2015/0269153 | A1 * | 9/2015 | Fink | G06F 17/2785 |
| | | | | 707/750 |
| 2016/0019299 | A1 * | 1/2016 | Boloor | G06F 16/9535 |
| | | | | 705/3 |
| 2016/0034260 | A1 * | 2/2016 | Ristock | G06F 8/34 |
| | | | | 717/109 |
| 2016/0170779 | A1 * | 6/2016 | Zielinski | G06F 13/10 |
| | | | | 703/26 |
| 2016/0171065 | A1 * | 6/2016 | Kumar | G06F 9/45533 |
| | | | | 707/756 |
| 2016/0173537 | A1 * | 6/2016 | Kumar | H04L 61/10 |
| | | | | 709/228 |
| 2016/0239280 | A1 * | 8/2016 | Scheiner | G06F 8/60 |
| 2017/0155627 | A1 * | 6/2017 | Goel | H04L 63/0815 |
| 2017/0329466 | A1 * | 11/2017 | Krenkler | G06F 9/453 |
| 2017/0359415 | A1 * | 12/2017 | Venkatraman | H04B 1/385 |

* cited by examiner

People and Organizations

Discovery – Find out as much as possible about this person and their organization.

- Who is this?
- What does he/she do? Are they important?
- Where does he/she work?
- What context does this organization have with ours?

Using existing knowledge and third-party sources (Google, LinkedIn, etc.) the system discovers:
- Names
- Job Titles
- Organizations
- Relationships with Organizations
- Geo locations

Disambiguation – *"Is this the same Bill Davidson who used to work at Big Corp?"*

Using confidence weighting and committee machines, the system determines likelihoods to reduce ambiguities.

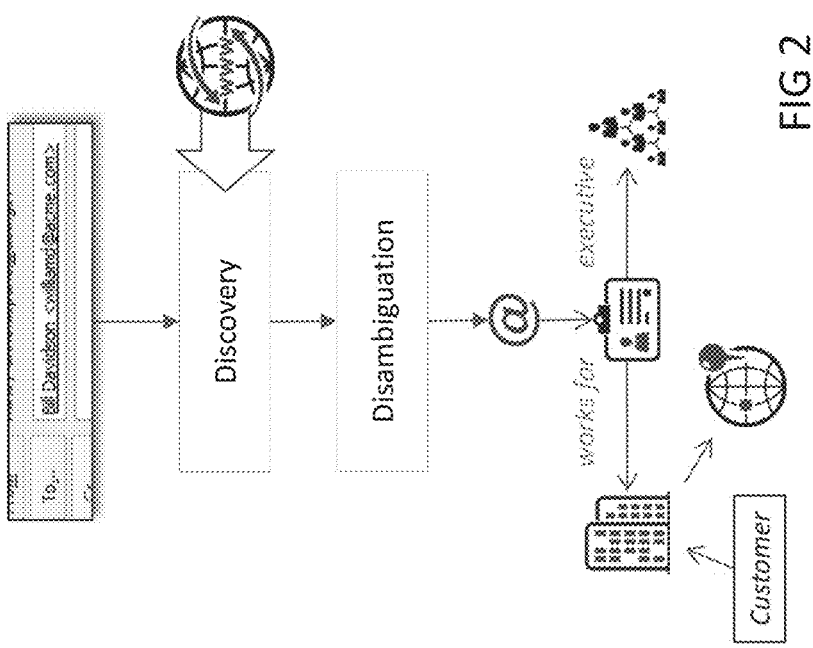

FIG 2

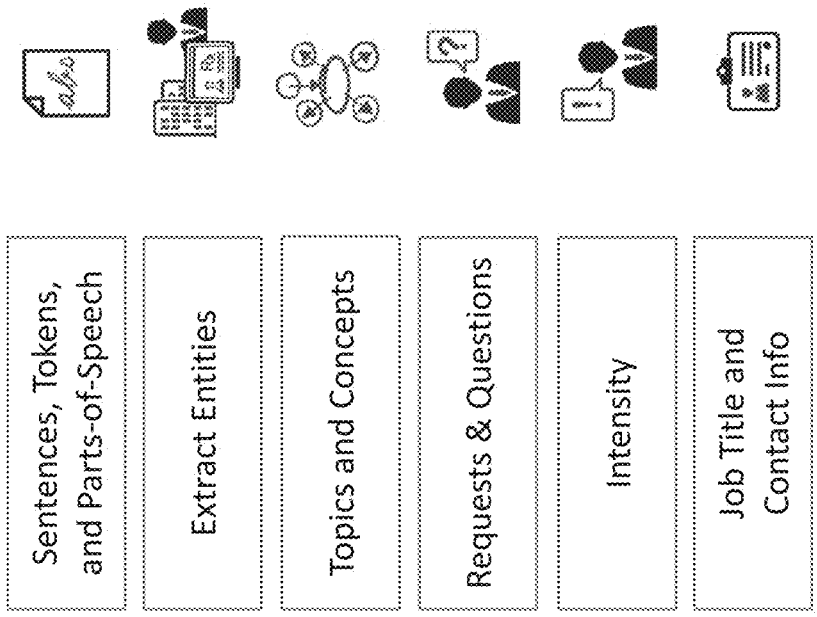
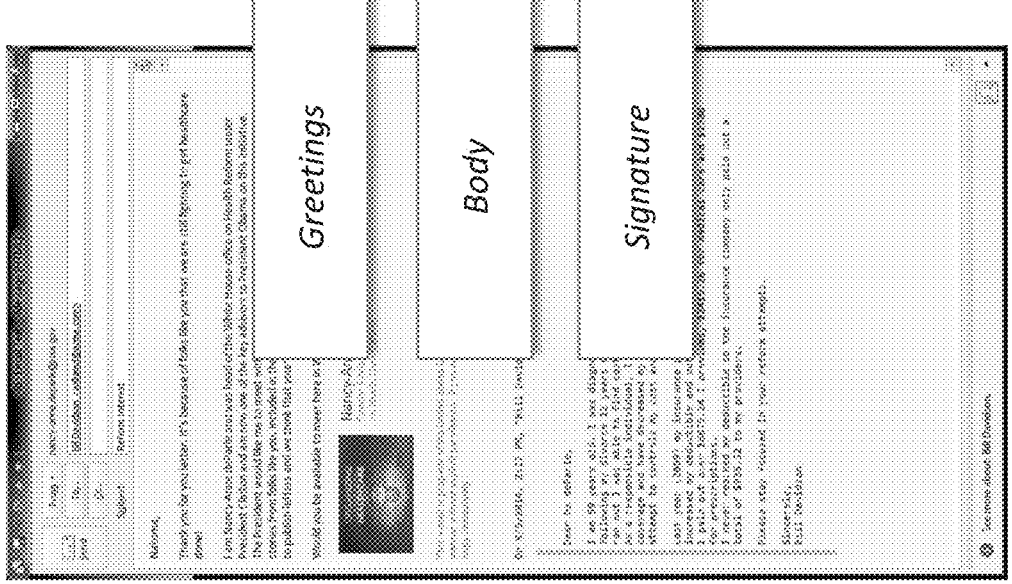
FIG 4

Sentences, Tokens, and Parts-of-Speech

Split the text into sentences and tokens, and label tokens with their parts-of-speech using lexical and syntax knowledge.

Topics and Concepts

Identify topics that clearly describe what the text is about. Extend and match these topics to higher-order concepts.

Implementing a series of complementary statistical and natural language processing techniques, key elements of the text are extracted and weighted for relevance.

Word sense disambiguation uses syntax to determine the contextual meaning of a word. E.g. the "Teeth" in your mouth vs. the "Teeth" of a mechanical gear.

Using organizational DNA and external sources, topics can be rolled up into known concepts. E.g. "Teeth", "Dentist" and "Cavity" are all related to the concept "Dentistry".

Concepts are also grouped hierarchically by other concepts.

Weighted analysis of Who is discussing What, over a period of Time, identifies common Activities.

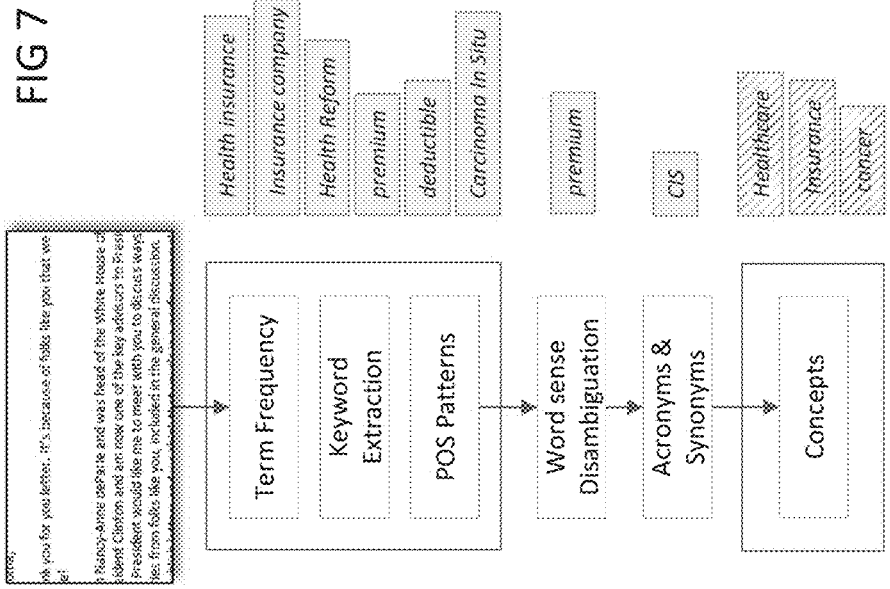

FIG 7

Requests & Questions

Identify any request for action from the text. E.g. a question or a task

Linguistic speech acts classification (Searle):
- Directives
- Commissives
- Assertives
- Expressives
- Declaratives This is more complex then just picking up on questions, e.g.
*"Could you book a hotel for my stay?"*

Also includes identifying various types of requests, e.g.
*"Please book a hotel for my stay."*

Free-format text requests do not always follow syntax grammar. A dynamic, natural language processing solution is used to understand the speech act and determine if an inquiry or request is being made by the author.

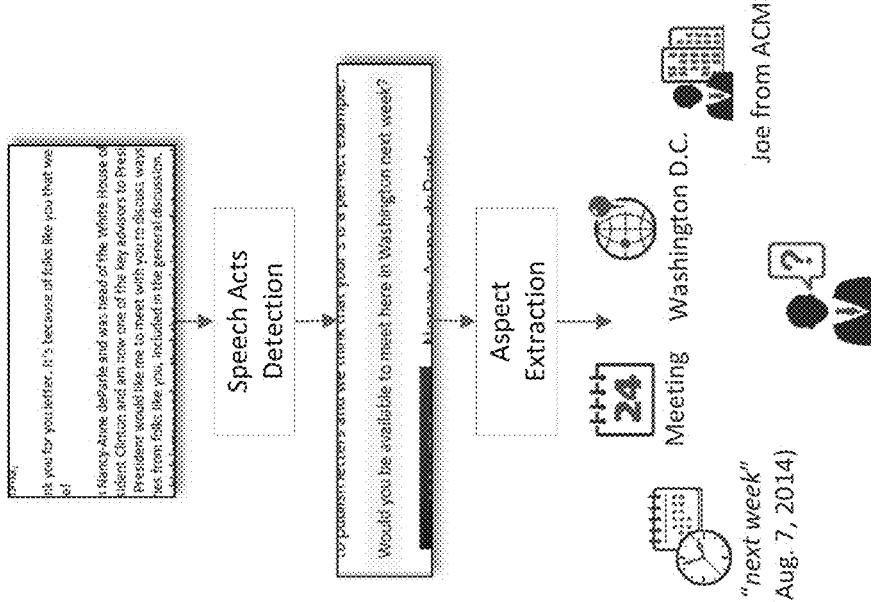

FIG 8

Intensity

Recognize when an author is expressing an intense, specific tone or demeanor.

Different than sentiment analysis — but more of "Mood/Tone Detection".

Combined with Entity Extraction and Parts-of-Speech, the entity that is the subject of the tone can be pinpointed.

Highlight emphatic expressions of:
- Anger/Frustration
- Urgency
- Criticality/Importance
- Sarcasm

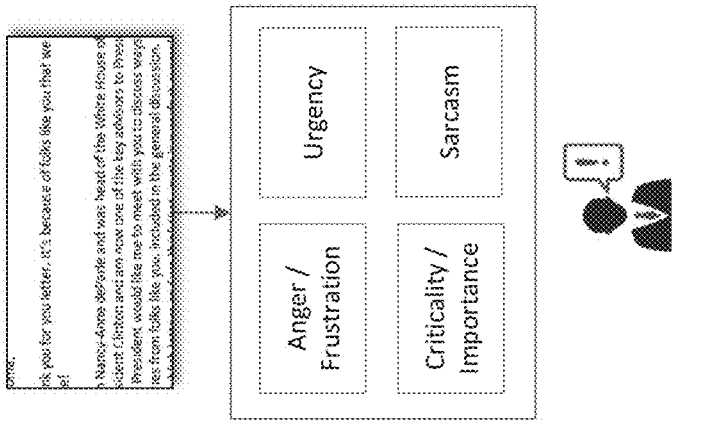

FIG 9

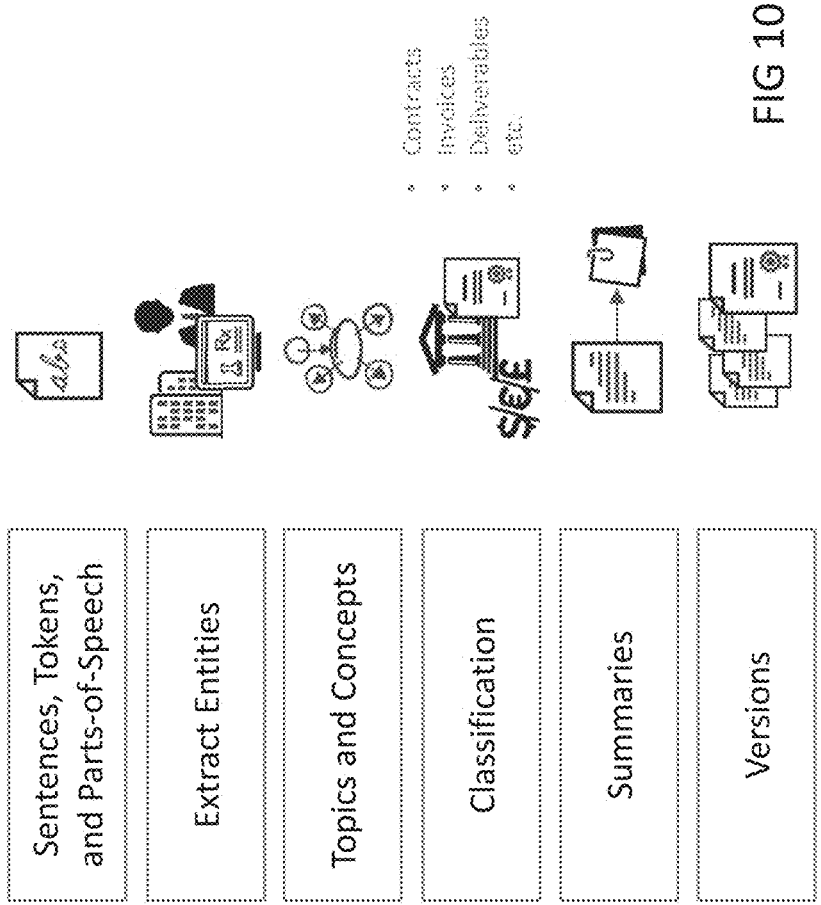
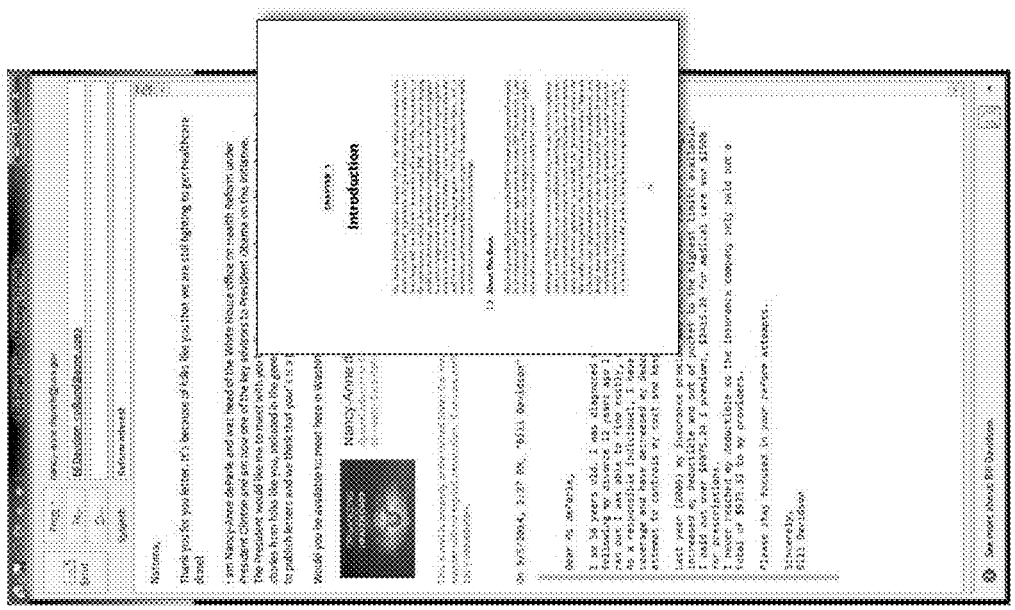
FIG 10

Organizational Intelligence

Topic/Concept Analysis
Localized and global

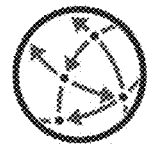

Similarity Comparisons
Multifaceted (Who, What, When)
Not just "keyword compare"

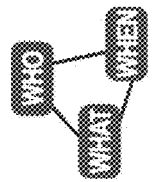

Inflection Detection
Highlight sudden changes
Trigger alerts

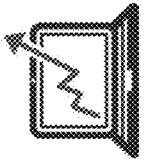

Activity Discovery
People working together on something

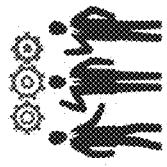

Social Network Analysis
A weighted network using a measure of connectedness

Trending and Predictive Analysis
Modelling and pattern detection

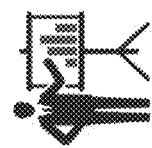

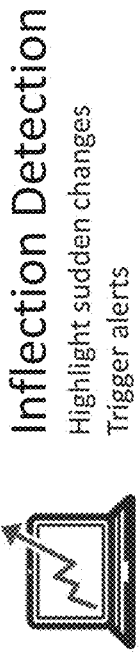

Inflection Detection
Highlight sudden changes
Trigger alerts

Examples:
- Decrease in strength of relationship with an individual or group
- Increase in discussions of a sensitive issue
- Increase in intensity in communications
- Increase in complaints
- Increase in questions and requests from another organization
- Increase in delayed response or unanswered questions
- Increase in volume of documents (on a particular topic) sent to another organization
- etc.

Trending and Predictive Analysis
Modelling and pattern detection

Examples:
- Customer Services issues
- Sales patterns
- Human Resources issues
- Early warning of customer/vendor relationship degradation
- Internal communication patterns
- Internal fraud detection
- etc.

SYSTEM AND METHOD FOR EXTRACTING AND UTILIZING INFORMATION FROM DIGITAL COMMUNICATIONS

CROSS-RELATED APPLICATION

The present application claims the benefit of priority under 35 U.S.C. § 119 from U.S. Provisional Patent Application No. 62/129,527 filed Mar. 6, 2015, the entirety of which is hereby incorporated by reference.

TECHNICAL FIELD

This invention relates to generally the field of digital communications.

BACKGROUND

In today's modern world, individuals use many forms of digital communications (email, chat, texting, etc). The sheer volume of these communications can be overwhelming, leading to cluttered inboxes, and making it difficult for busy professionals to locate important communications and/or to respond timely and appropriately. Conventional email management tools attempt to organize one's inbox by sorting the emails based on predefined criteria, for example by date, sender, or by flags manually entered by a user. However this requires a user to think about what information to enter (importance, date to follow up by, subject headings) or to consider what keywords to include to allow for subsequent search and retrieval.

However, this takes time and effort on the part of the user, and an overwhelmed professional who has a very full inbox will tend to rush to respond to deal with such an inbox, leading to failures to correctly enter the appropriate information to allow for subsequent retrieval. Further such rushed communication tends to result in email messages without well formatted text. Email messages often contain:

Weak sentence structure
Missing punctuation and poor capitalization
Slang and colloquialisms
Bullets, tables, emoticons, etc.

This hinders the ability for conventional tools to be able to locate and classify particular communications, which can adversely affect both the sender and the recipient. This can exacerbate the problem, making it even more time consuming and more difficult to prioritize important and urgent communications and tasks.

Further, in these communications, the communicator (also known as the "sender", or "author") may semantically refer to one or more digital artifacts (also known as a "computer files", or simply "files") that may or may not be included as part of the communication. It is up to the reader of the communication to understand the communicator's semantic reference and then correlate it with a particular artifact, or artifacts.

However, this takes time and effort on the part of the recipient. An overwhelmed professional with a large collection of artifacts may spend an objectionable amount of time attempting to correlate and find a particular digital artifact.

There is a need for a system which can automatically identify when a communicator is referencing a digital artifact, and when appropriate, assist a recipient in resolving that reference to a particular digital artifact, or when ambiguous, a set of candidate artifacts that best match the context of the reference. These artifacts may be included with that communication, and/or included with a previous communication, and/or stored in an archive that is available to the system user.

There is a need for a system which can automatically understand the nature of a communication and assist users in prioritizing and responding to a variety of communications from a multiple sources.

SUMMARY

Aspects of the present disclosure seek to eliminate, or at least mitigate, disadvantages of known systems and methods. Other aspects provide for alternative solutions. Still other aspects provide new or improved features.

Thus aspects of the disclosure provide systems, methods and software for managing digital communications. Some embodiments are directed to doing so for entire organizations, and/or sub-groups within an organization. Some embodiments are directed to assist individual users manage their digital communications. Other embodiments compile results for groups of individuals to manage information contained in said communications on a group or organization wide level.

By understanding the primary speech acts within a message and related messages, and by resolving the people, thing(s) and time(s) related to those speech acts, embodiments can determine whether the sender of the message is requesting the recipient to perform an action, if the sender has committed to performing an action, or otherwise. Such as system can prioritizes these requests and commitments by considering the message's apparent relevance, implied or explicit importance, implied or explicit urgency, and arrival time. Depending on the nature of the action and the completeness of details available within the message(s), the system may automatically proceed with the action, if appropriate, notifying upon completion. Alternatively, the system may alert the appropriate user, who then has the option to have the system assist them in the completion of the task, if applicable. The system can assist the user by suggesting one or more actions with one or more suggested options. In the case where the system does not have enough information to make a specific suggestion, the user is prompted to optionally provide such information so the system can then reevaluate and provide suggestion(s)/option(s) or automatically proceed with the action if appropriate. The user may alternatively complete the task offline and/or without the assistance of the system, in which case they can mark the task as completed. The user may also defer the task, setting up a reminder for later.

Other embodiments can process natural language enquiries to find answers to questions, without requiring users to sort information, or determine search strategies to best locate information.

An aspect of the disclosure provides a computer implemented method including receiving a digital communication; analyzing said communication using natural language processing to identify any semantic reference to one or more digital artifacts; and identifying and locating the one or more digital artifacts. In some embodiments one or more digital artifacts are not specifically identified in the digital communication. In some embodiments one or more digital artifacts are not specifically included in the digital communication.

Another aspect of the disclosure provides a system for processing communications. Such a system includes a communication interface for receiving a communication; a processing module for analyzing said communication using natural language processing to determine at least one context said communication; and an application module for applying the context of the communication to identify any semantic reference to one or more digital artifacts and for identifying and locating the one or more digital artifacts.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

FIGS. 1-19 are slides which illustrate schematically features of embodiments.

DESCRIPTION OF EMBODIMENTS

A system according to an embodiment processes one or more digital communications (email, chat, texting, etc.) and derives a contextualized understanding of the people involved and the topics discussed. For example the context of the people involved in a communication includes more than their name, but the role they have in that communication. A person may have many roles—sales manager for a particular product or territory, manager of other individuals, and direct report to someone else (as well as roles in their personal life which may include, for example, father, son, director of charity, etc). The system then applies this context for the purpose of summarizing, measuring similarity, predicting (and even facilitating) appropriate responses, prioritizing inbound communications, analyzing responses and/or measuring the strength of relationships. Further embodiments are configured to determine each person's reason(s) for conversing.

Applications of this system include, but are not limited to, assisting a user in finding and organizing their communications, assisting a user in managing tasks and responding to communications, assisting in the monitoring and surveillance of communications, and providing eDiscovery, analytics and insight into communications and interaction patterns.

Before discussing the details of the system, we will first discuss a series of slides highlighting portions of a typical email, and features of embodiments to analyze different aspects of email communications.

Figure 1:
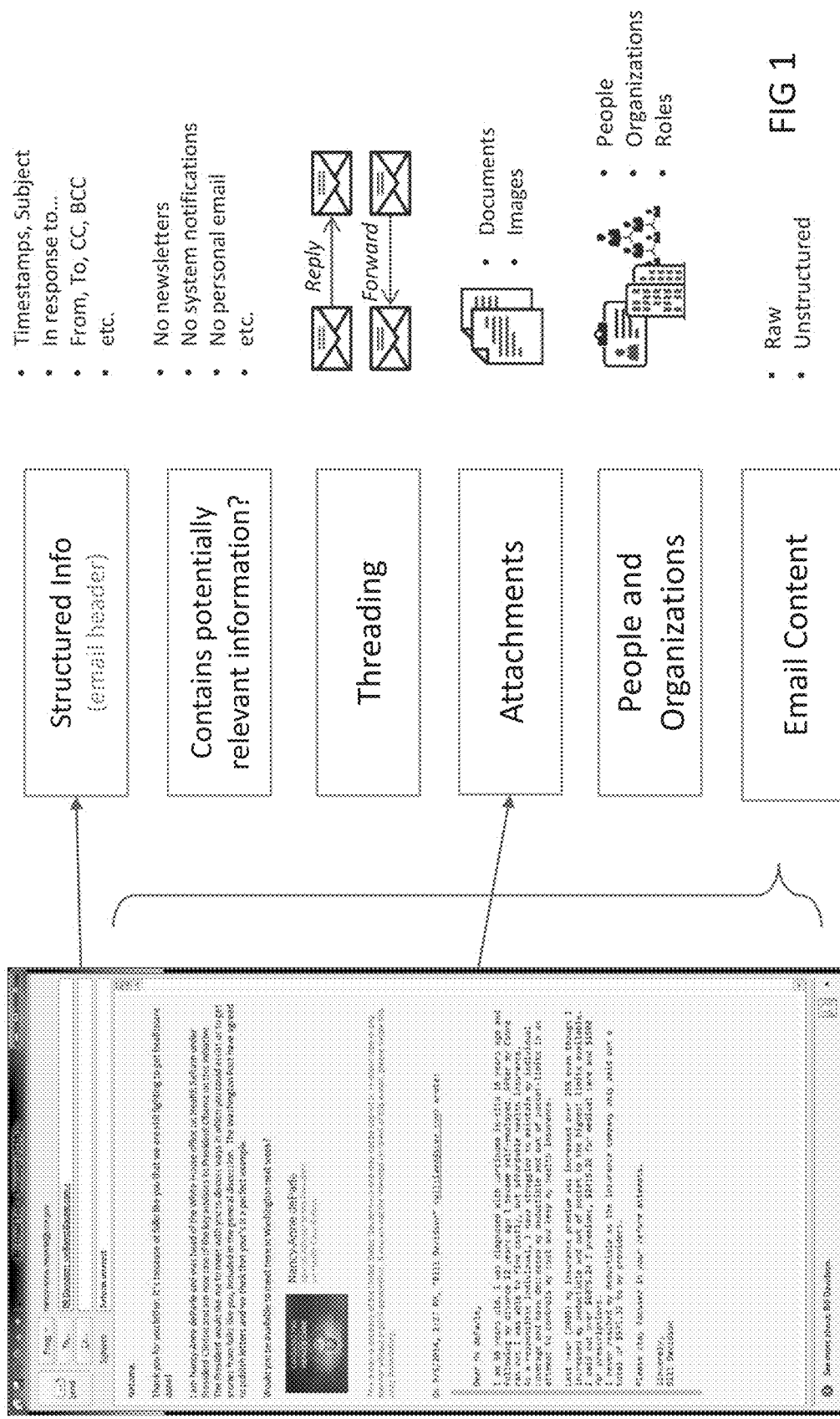

FIG. 1 is a slide schematically illustrating an example email and the types of information that can be deduced from it. First, an email includes structured information, which can be extracted from its header, including timestamps, the subject, the communicators (sender(s) and recipient(s), whether it is a new communication or in response to an earlier communication, etc. . . . . The email potentially contains relevant information to an organization. Some embodiments attempt to screen irrelevant information, for example newsletters, personal emails and system notifications. The system can make use of threading information including earlier versions, and whether a particular email is a reply to another email, and whether the communicators have changed. As but one example, the fact a recipient chooses to forward an email can be useful in determining the growing importance of an email chain, depending on who is forwarding, and to whom. Various embodiments can consider threads as a whole to summarize topics/concepts relevant to the thread and the various communicators.

A communication can also include one or more attachments, including documents and images which can be processed and analyzed (see, e.g., the discussion related to FIG. 10 below). Various embodiments can analyze the People and Organizations relevant to a communication, and the roles played by each. Further, various embodiments can analyze the email content, including raw and unstructured information contained information to determine, as will be discussed in more detail below.

FIG. 2 is a slide illustrating the role centric nature of various embodiments. The system can discover the people and organizations relevant to a communication including determining the roles of the communicators. The system can discover information about a communicator (or a person mentioned in a communication) do determine who they are, what organization(s) they are affiliated with, what roles they play to determine whether and why they are (or may be) important. This feature will be discussed more below with reference to FIG. 23.

Figure 3:
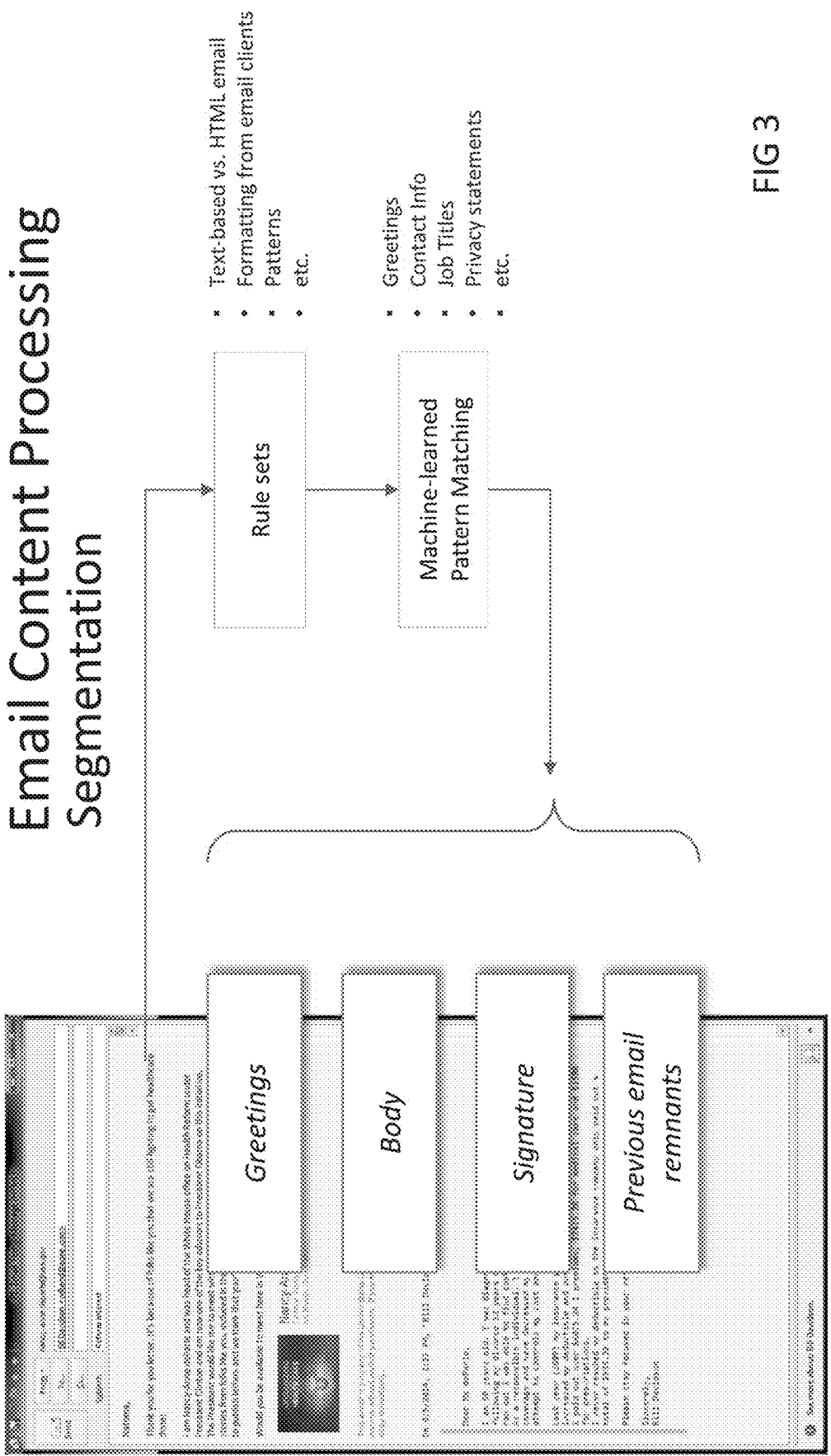

FIG. 3 is a slide illustrating a portion of email content processing directed to segmentation, according to an embodiment. Most emails contain a greeting, a body, which includes the (new) content, a signature, and if the email is part of a thread, previous thread remnants. The system uses Rule Sets and Machine-learned Pattern Matching for the segmentation. For Example, the system uses a set of rules, looking for patterns and features to identify possible segment delimiters. For example, typically greetings occur at the beginning, often on a single line, include text such as "Hi", "Good morning", etc. and frequently contain the first name, or nick name, of a recipient. The system also uses previous communications from the sender to identify identical sections of text to recognize a possible email signature and/or disclaimer. Once the system has collected a series of possible segment delimiters, each with varying confidence depending on how it was determined, a voting algorithm is used to conclude any distinct segments.

FIG. 4 is a slide illustrating Data Mining aspects of an email content processing system, according to an embodiment. Such a system would analyze the text to determine the sentences, tokens, and parts of speech. This will be explained more below with reference to FIG. 5. Some embodiments can also Extract Entities to identify the people, places and things (concepts) that are mentioned in the text. This will be discussed more below with reference to FIG. 6. Some embodiments can also determine the Subject Matter (Topics and Concepts), as will be discussed more below with reference to FIG. 7, and will determine the presence of any Requests and Questions, which will be discussed more below with reference to FIG. 8. Some embodiments can determine the intensity of a communication, which will be discussed more below with reference to FIG. 9. The system can also determine the Job Title and Contact info (from the Signature portion of the email, possibly additionally from other sources)

Figure 5:
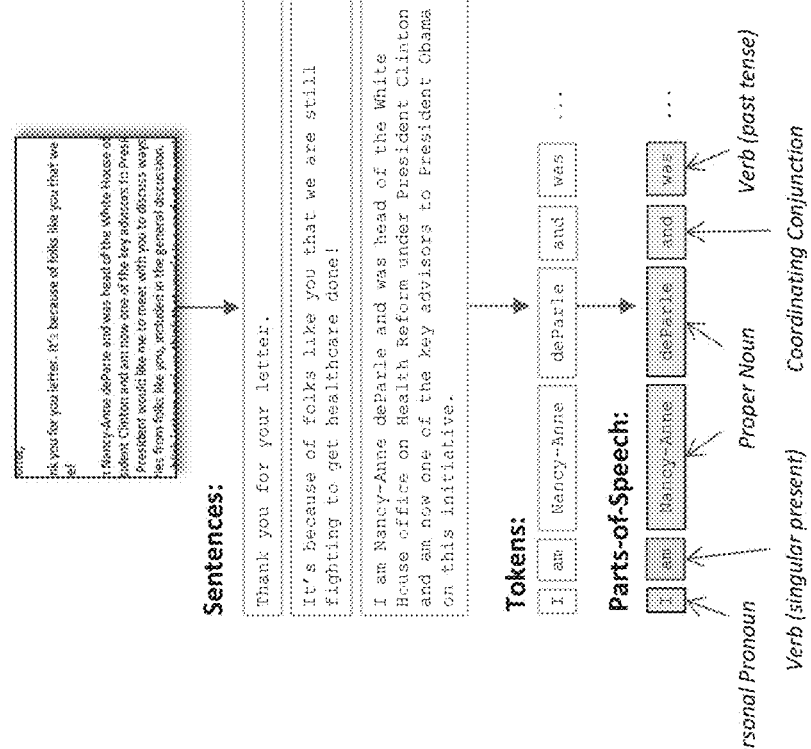

FIG. 5 illustrates a portion of the natural language processing carried out by a system according to an embodiment, which splits the text into sentences and tokens, and labels tokens with their parts-of-speech using lexical and syntax knowledge.

Figure 6:
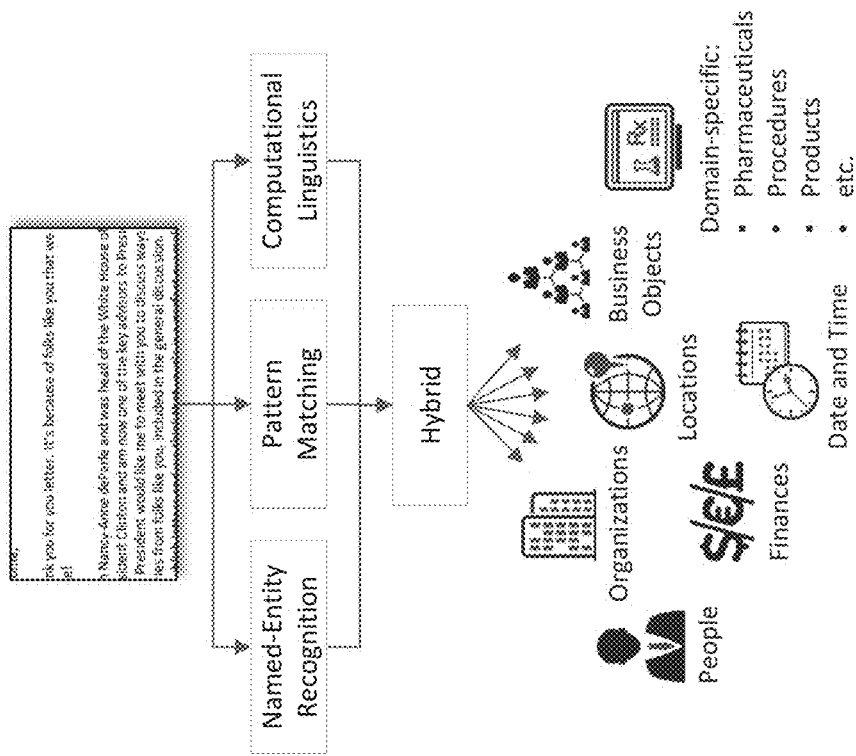

FIG. 6 illustrates how a system according to an embodiment extracts entities to identify the people, places and things that are mentioned in the communication. Such a system uses a hybrid approach which utilizes NER, pattern matching and computational linguistics. For some embodiments, such hybrid approach, can also use one or more of:

internal and external Knowledge about an Organizational Structure (business units, divisions, roles, people, etc);

a Custom Dictionary Name Finder;

Document-level knowledge for disambiguation; and

Computational Linguistics techniques to improve the result an NER.

Computational linguistics is "statistical" natural language processing, which draws inferences such as: if This and not That, then there's a 80% chance that Such is true.

FIG. 7 is a slide which illustrates how an embodiment determines the topics and concepts of a communication in order to determine what a communication is about, and what is discussed therein. The slide includes a flowchart and examples which illustrate how complementary statistical and natural language processing techniques are used to determine key elements of the text which are weighted for relevance. Word sense disambiguation uses syntax to determine the contextual meaning of a word. E.g. the "Teeth" in your mouth vs. the "Teeth" of a mechanical gear. Using organizational DNA and external sources, topics can be rolled up into known concepts. E.g. "Teeth", "Dentist" and "Cavity" are all related to the concept "Dentistry". Concepts can be grouped hierarchically by other concepts. In some embodiments, Weighted analysis of Who is discussing What, over a period of Time, identifies common Activities.

Subject Matter and Topics are the generally synonymous and refer to "SPECIFICALLY" WHAT something is about. E.g. this paragraph is about "subject matter". Concepts are at a higher level. They refer to "GENERALLY" WHAT something is about. Another word for it is "generalization". Context is multidimensional and has a perspective. It refers to the WHO, WHAT, WHEN (and sometimes WHY) of something, as well as from a given perspective (like from the perspective of a person, or from the perspective of an organization). E.g. ACME is a company—but from the perspective of a particular organization, they are an important customer.

Another part of the natural language processing used by the system, involves using linguistic speech acts classification. This is illustrated in FIG. 8 regarding determining the presence of requests and questions according to an embodiment. However, the use of speech acts can be also utilized in other steps.

Further, as will be explained below, once requests and questions have been determined, some embodiments include an assistance engine to facilitate the complying with the request (for example, to book a meeting or send a document) or the answering of the question.

FIG. 9 is a slide that illustrates a process, according to an embodiment, which when combined with entity extraction and the natural language processing described above, determines and highlights when an author is expressing an intense tone or demeanor. For example, such a system can highlight emphatic expressions of: Anger/Frustration; Urgency; Criticality/Importance; and/or Sarcasm.

FIG. 10 is a slide illustrating how a similar data mining process can be used for documents (including documents attached to a communication).

Figure 11:
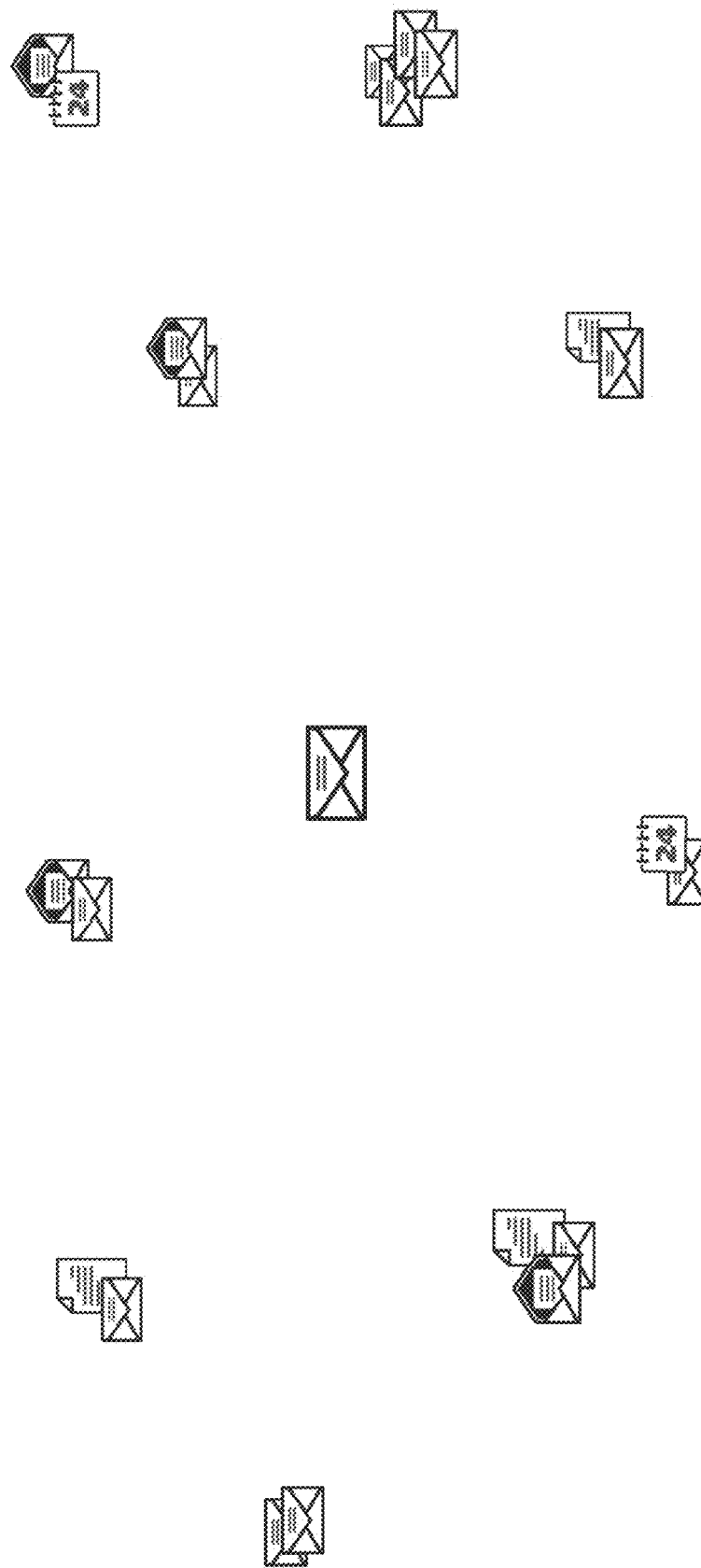
Figure 12:
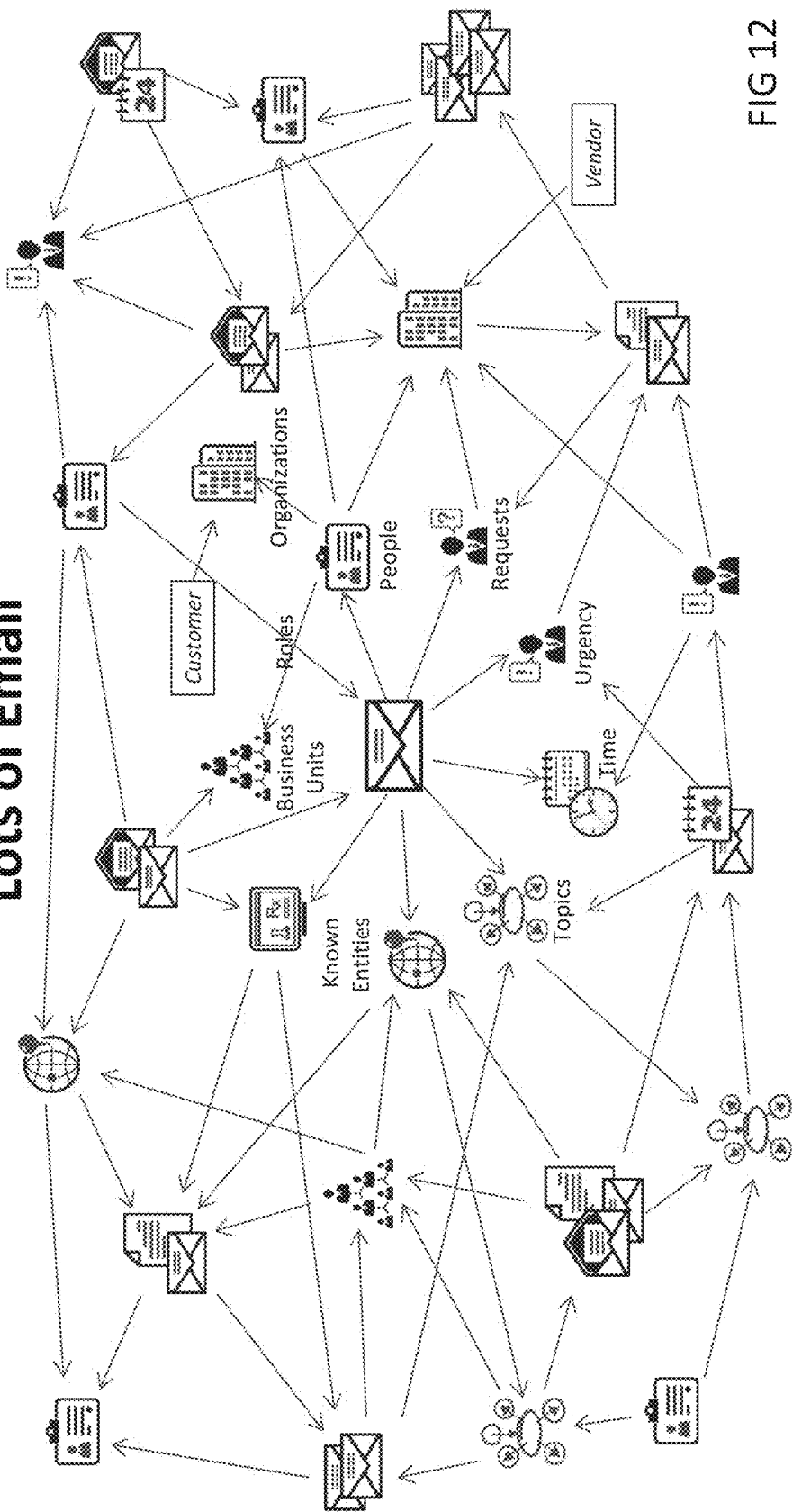
Figure 14:
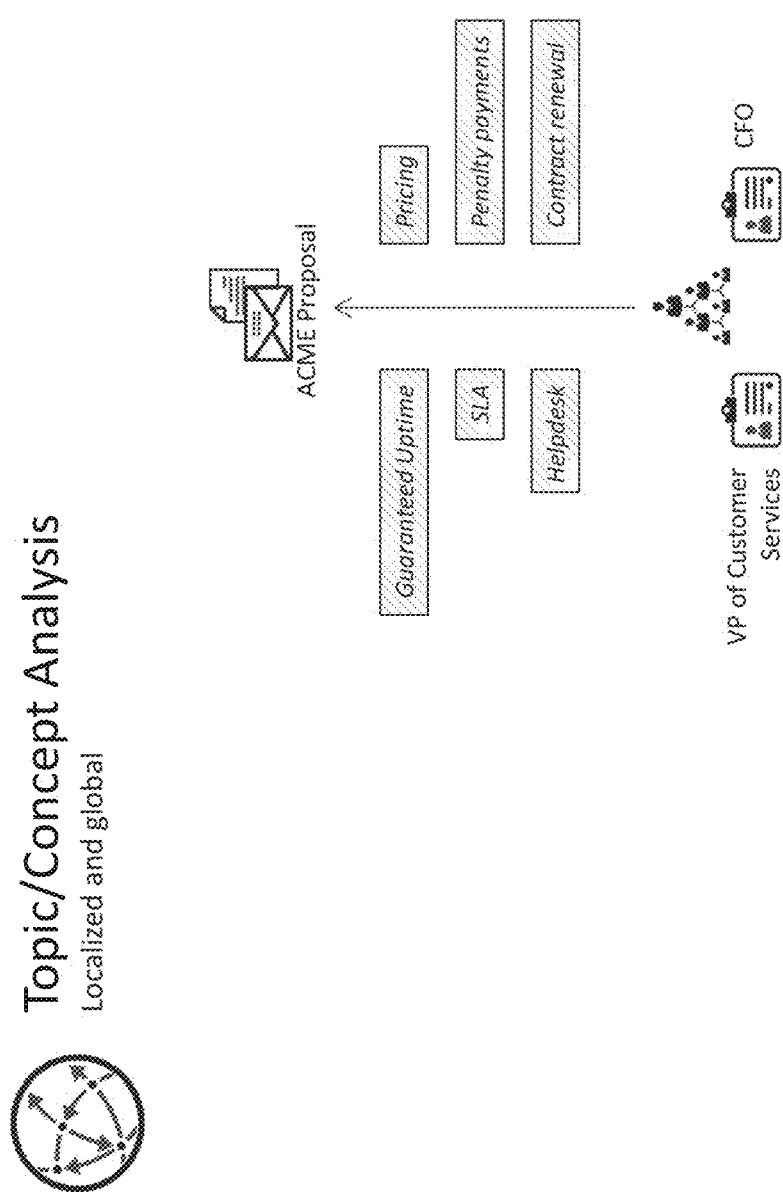
Figure 15:
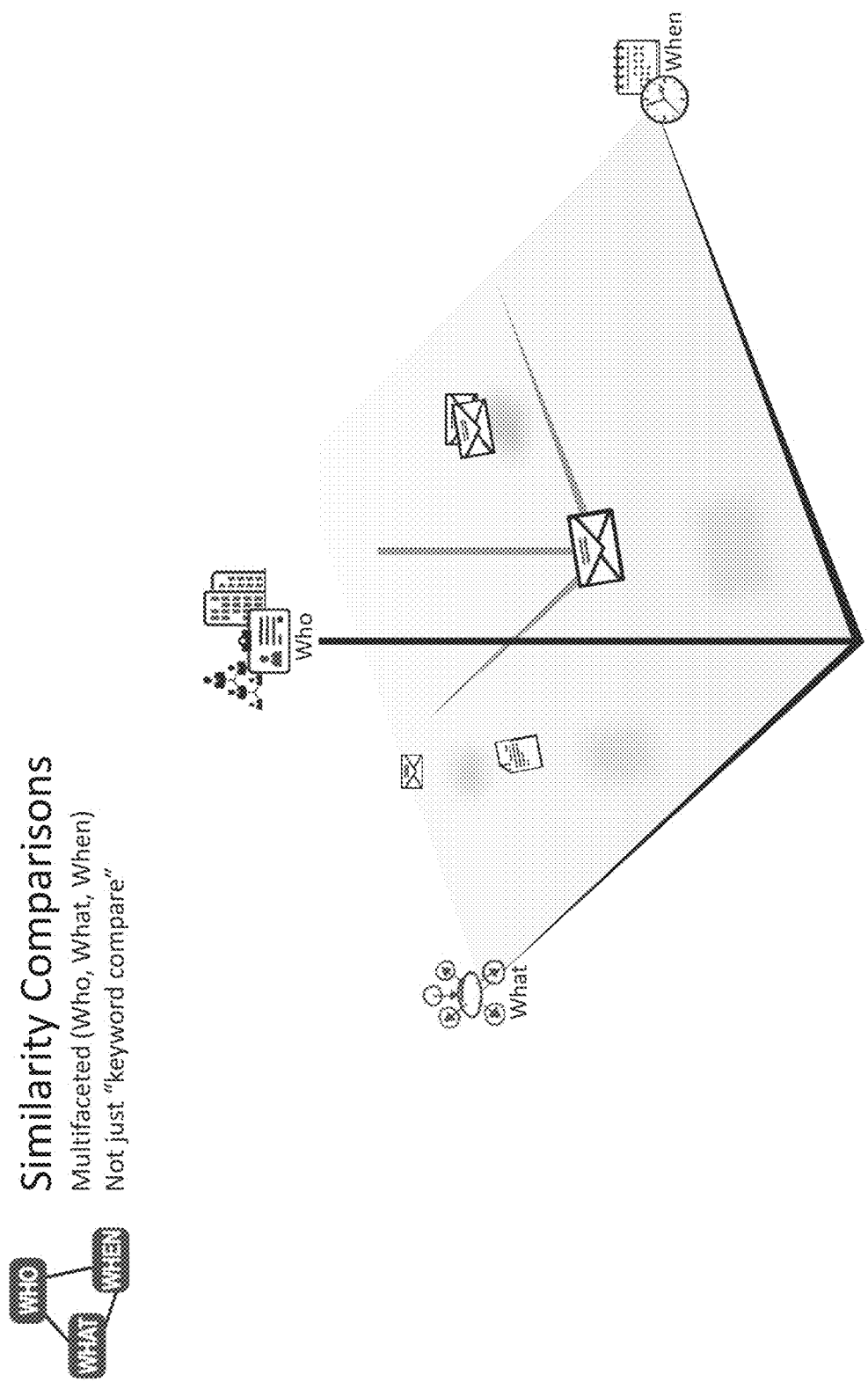
Figure 16:
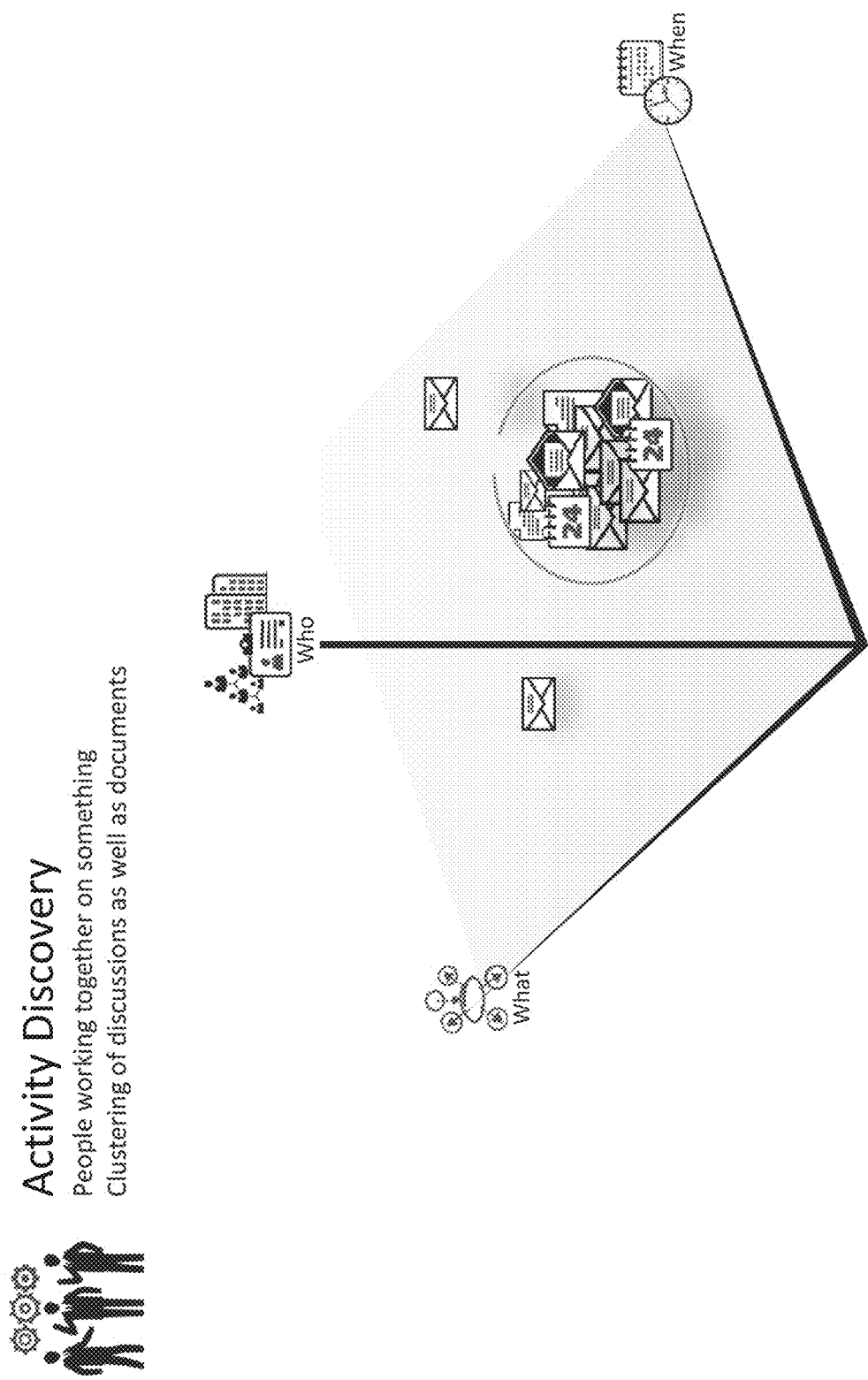
Figure 17:
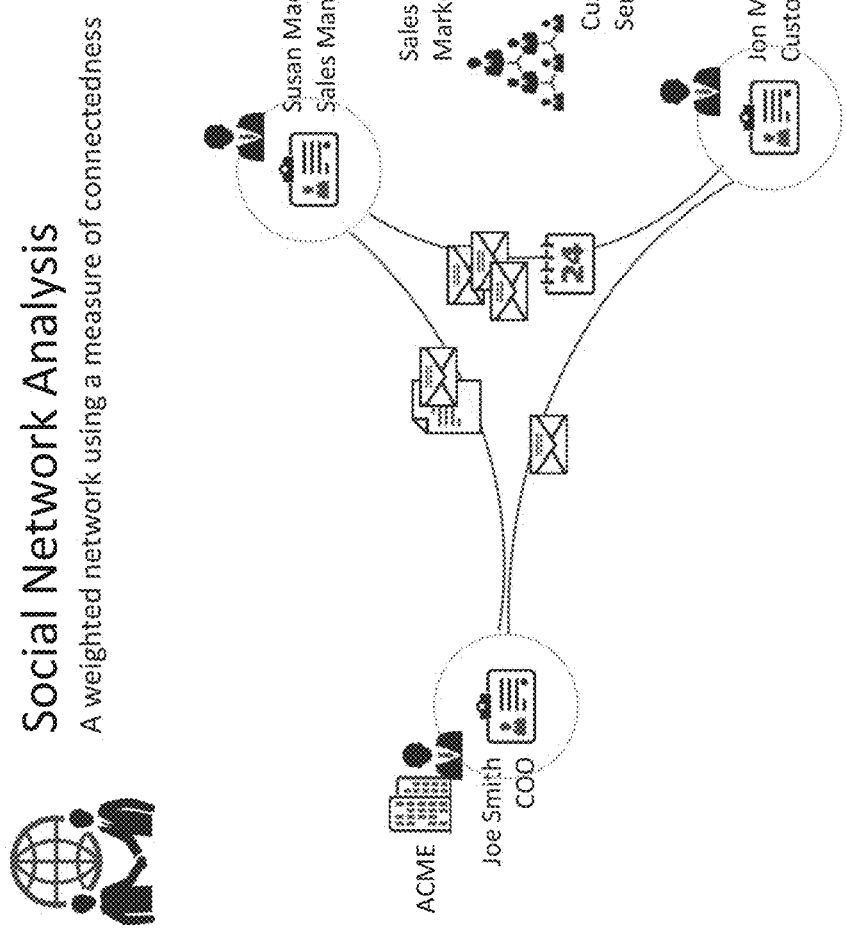
Figure 19:
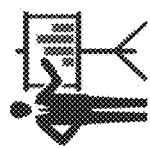

FIGS. 11 and 12 are slides which illustrate how you can use such a system to convert lots of individual emails (and/or other communications) into a lot more than just email, but framework for organizing information related to organizations, business units, people, vendors, customers, suppliers and other know entities and the communications between them and the roles of individuals involved and the relative importance and urgency of communications there between.

FIGS. 13-19 are slides which illustrate example applications and features which such a system can enable, according to various embodiments.

Figure 20:
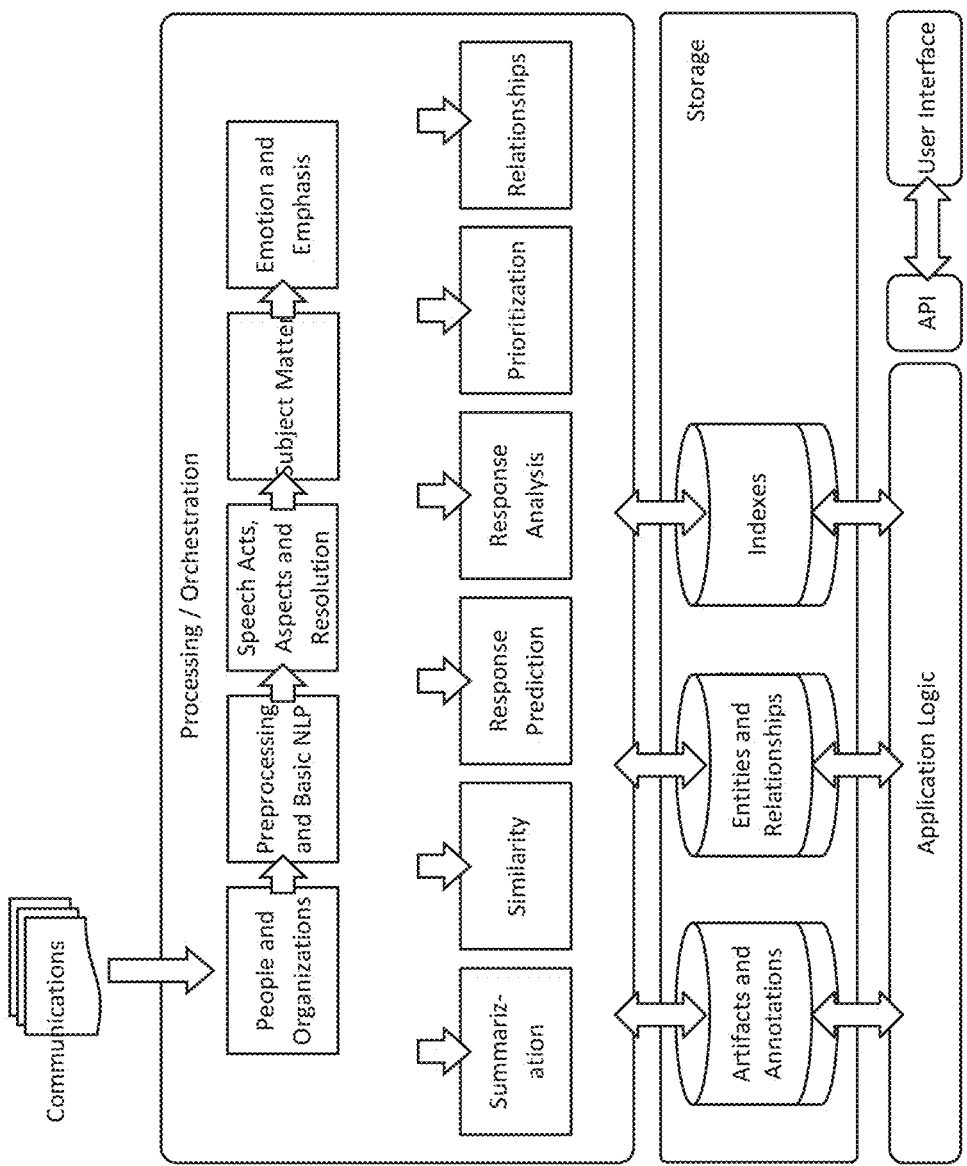
FIG. 20 is a system block diagram illustrating components of a system according to an embodiment.

FIG. 20 is a system block diagram illustrating a system architecture, according to an embodiment. Such system includes a communication interface for receiving a communication to be processed, a Processing/Orchestration module, which in this embodiment includes a number of sub modules for analyzing said communication, one or more storage units for storing and retrieving data, said data typically stored in a plurality of databases, application logic, and at least one API for communication with users via a user interface.

The system Processing/Orchestration module includes a series of sub-modules for performing a series of processes. These processes are orchestrated and managed by the system, operating either asynchronously or synchronously conditional on interdependencies. It should be appreciated that these modules are displayed logically and comprise one or more subroutines which can be combined in a variety of ways, such that not every system necessarily requires each of the individual modules as shown.

The People and Organizations module collects and derives details about people and their organizations. This module executes step 1.1 Collect and derive person details discussed below with reference to FIG. 23.

The Preprocessing and Basic Natural Language Processing (NLP) module subdivides the message into its primary components and then further segments the core body into the basic constructs of language. This module executes the steps of (1.2) Subdivide a message into its primary components and (1.3) Identify basic linguistic constructs discussed below with reference to FIGS. 22 and 24.

The Speech Acts, Aspects and Resolution module performs higher level NLP. This module attempts to identify and classify speech acts within each sentence and identifies the aspects of these speech acts. Then the module attempts to resolve supposedly vague references. This module executes the steps of (1.4) Classify speech acts, (1.5) Identify aspects of the speech acts and (1.6) Resolve references discussed below with reference to FIGS. 22 and 25.

The Subject Matter module determines the primary subject matter(s) of a message and of an entire conversation. This module executes step (1.7) Identify primary subject matter(s) discussed below with reference to FIG. 26.

The Emotion and Emphasis module measures the degree of emotion or emphasis that is revealed in the authors tone. This module executes step (1.8) Measure emotion and emphasis.

The modules above, in this embodiment, are configured to execute the sub steps of step (1) derive the context of the conversation. The remaining (sub) modules of the Processing/Orchestration module in this embodiment execute the sub steps of step (2) Apply the context of the conversation as discussed below with reference to FIGS. 21 and 27.

The Summarization module uses the primary subject matters and any identified speech acts to summarize a conversation into a shortened description. This module executes the step (2.1) Summarize the conversation.

The Similarity module evaluates similarity of conversations across the people involved, the time the conversation occurred, the subject matter(s) discussed and the digital assets that were included. This module executes the step (2.2) Measure similarity.

The Response Prediction module generates and evaluates the most appropriate response and/or action for the recipient(s), for example based on the action type of a directive. This module executes the step (2.3) Predict appropriate response(s) and/or action(s).

In the event that a response is made to a previous directive, the Response Analysis module generates and evaluates the most appropriate response and/or action for that response. This module executes step (2.4) Analyze responses.

The Prioritization module prioritizes inbound communications based on importance, relevance, urgency, and delivery time of a message. This module executes step (2.5) Prioritize inbound communications for a recipient.

In order to estimate the strength of the relationship between two people, the Relationships module considers multiple factors including the nature and patterns of their communications and meetings. This module executes step (2.6) Estimate the strength of interpersonal relationships The system uses various types of storage depending on retrieval requirements and demands. This example shows three main types of storage, but other forms of machine readable memory are used, including system memory which stores software instructions which when executed by one or more processes, executes the steps described herein.

A large Artifacts and Annotations data store is used to store all messages and associated documents. In addition to the original artifacts, annotated copies are also stored.

A large Entities and Relationships graph is used to store the numerous relationships between all messages, documents, subject matters, people, organizations, etc.

To service the application with optimal retrieval performance, the key entities and any required attributes and related data are stored in one or more high performance denormalized indexes.

In general, the application logic manages the retrieval of information from storage as well as the creation and updating of information coming from the User Interface. The application program interface (API) is responsible for interaction between the Application Logic and any User Interface and/or other applications. The User Interface (UI) allows the users to interact with the system. Depending on the application, it may provide searching, analytics, assistance or work flow capabilities. The UI may be be web-based, mobile or other.

Figure 21:
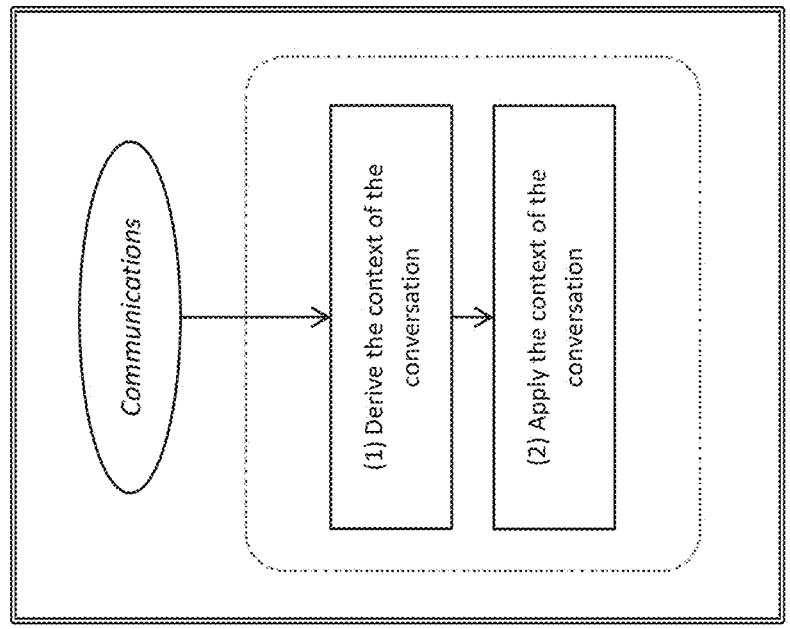
FIGS. 21-27 are flowcharts illustrating method steps according to various embodiments.

FIG. 21 is a flowchart illustrating steps executed by one or more processors to carry out the methods described herein, according to an embodiment. In this embodiment, there are two main steps, although these are subdivided into sub-steps. First, the system derives the context of the conversation (1).

The system processes interpersonal digital communications (including possibly a series of inter-related communications) and derives a contextualized understanding of the people involved and each person's reason(s) for conversing. This includes:

1. details about the people involved,
2. the primary subject matter(s) of the conversation,
3. who made requests and/or asked questions of whom,
4. who provided responses, made commitments, etc., and
5. any significant emotion and/or emphasis expressed.

Then, the system applies the context of the conversation (2). The system then applies this context with the purpose of:

1. summarizing a conversation,
2. measuring the similarity of a conversations with other conversations,
3. predicting appropriate response(s) and/or action(s) as a result of a conversation,
4. prioritizing inbound communications for a given recipient,
5. analyzing responses, and/or
6. measuring the strength of interpersonal relationships.

Figure 22:
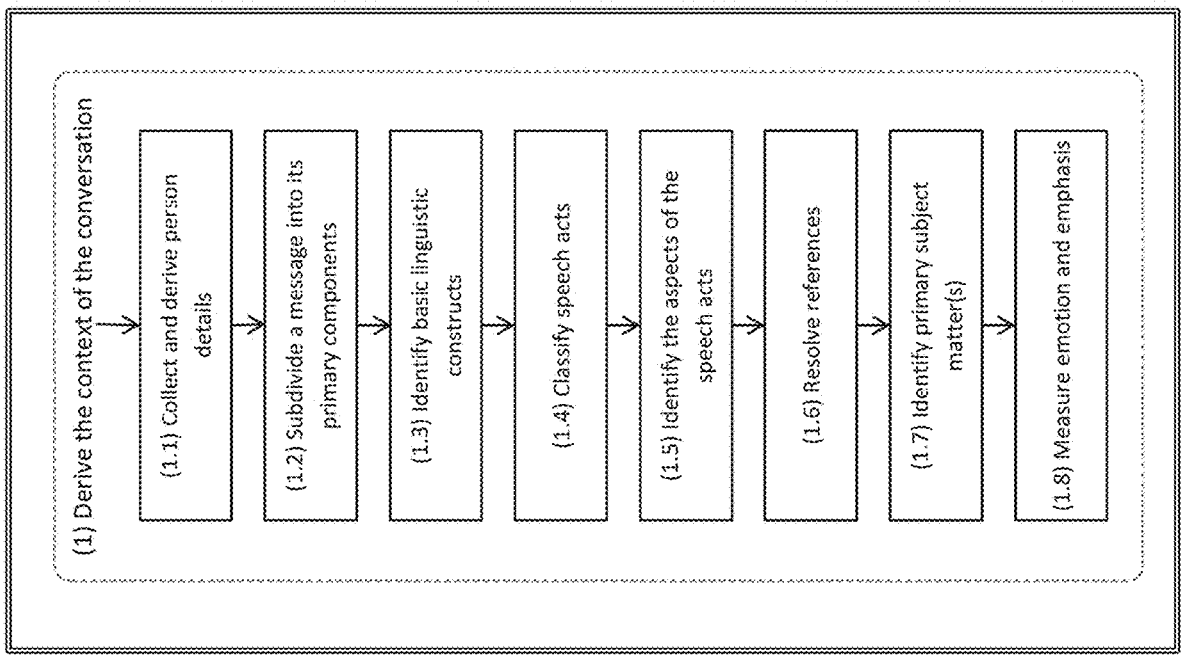

FIG. 22 is a flowchart illustrating more details of step (1), according to an embodiment. These substeps include:

(1.1) Collect and derive person details;
(1.2) Subdivide a message into its primary components;
(1.3) Identify basic linguistic constructs;
(1.4) Classify speech acts;
(1.5) Identify the aspects of the speech acts;
(1.6) Resolve references;
(1.7) Identify primary subject matter(s); and
(1.8) Measure emotion and emphasis.

It should be appreciated that not every embodiment necessarily needs to perform each step for each communication. Further some embodiments can perform additional steps. As but one example, to determine the subject matter of any given communication, the system can also look to other sources of information, including related communications. Communications can be related by subject matter, or by the people involved in the communication, and their recent communication history. As but one example, if there has been a lot of recent communications between a group of individuals, and historically this group (or a sub-group) has not communicated with the same frequency, then the system can (i) conclude the recent series of communications may very well be related (i.e. had a high weighting to the possibility they are related) and (ii) look to these recent communications to determine if they can help resolve any ambiguities in the communication being analyzed.

Figure 23:
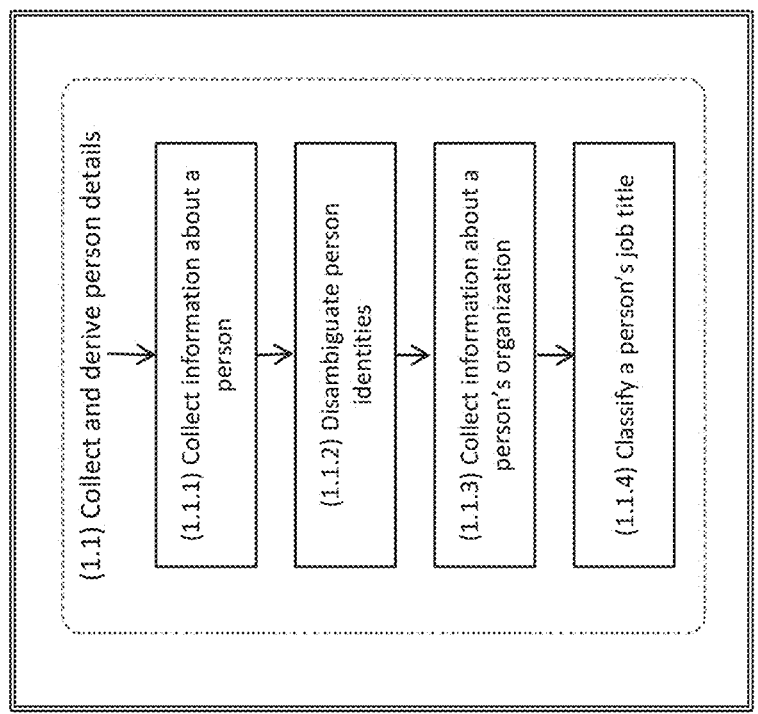

FIG. 23 is a flowchart illustrating more details of sub-step (1.1), according to an embodiment. These substeps include the following.

(1.1.1) Collect Information about a Person

If a person is not yet known to the system, using the limited information available, the system searches third-party resources in an attempt to collect more information about that person. This additional information may include: their first and last names, their gender, a publicly available avatar, the organization that person works for, their job title at that organization, as well as contact information such as phone numbers, physical and mailing addresses, and virtual and social locators such as website, LinkedIn profile, Twitter username, etc.

(1.1.2) Collect Information about a Person's Organization

In a business setting, the system also collects information about the organizations for whom each person works. If an organization is not yet known to the system, the system searches third-party resources in an attempt to collect more information about that organization. This additional information may include: the organization's industry sector(s), approximate size, description, logo, as well as contact information such as phone numbers, physical and mailing addresses, and virtual and social locators such as website, LinkedIn profile, Twitter username, etc.

(1.1.3) Disambiguate Person Identities

In the case where multiple possibilities exist for a person's identity, the system works through a series of steps to disambiguate the person's identity. Using the person's organization information (if available) and the identities of connected people (if available), the system compares these with the information from third-party resources in an attempt to weigh the likelihood of each candidate identity. When the system still cannot narrow down the person's identify, the system defers the disambiguation until more information is available, either from additional communications or additional information from the third-party resources.

(1.1.4) Classify a Person's Job Title

The system then attempts to classify a person's job title. This may be hierarchial, depending on the organization. For example, one embodiment classifies people as either: executive, management, or practitioner. This is done using both a set of rules and a trained, machine-learned classifier. The combined result is the likelihood that a particular job title belongs to each of the three possibilities. A conclusion is drawn only when one has significant likelihood and is unambiguous.

(1.2) Subdivide a Message into its Primary Components

The system subdivides the communication into its primary components. These components optionally include: salutation, the core body of the communication, valediction, and in the case of email messages: email signature, disclaimer, notes and remnants of previous messages. When applicable, the system also segments any attached or inline digital assets e.g., images and documents.

Figure 24:
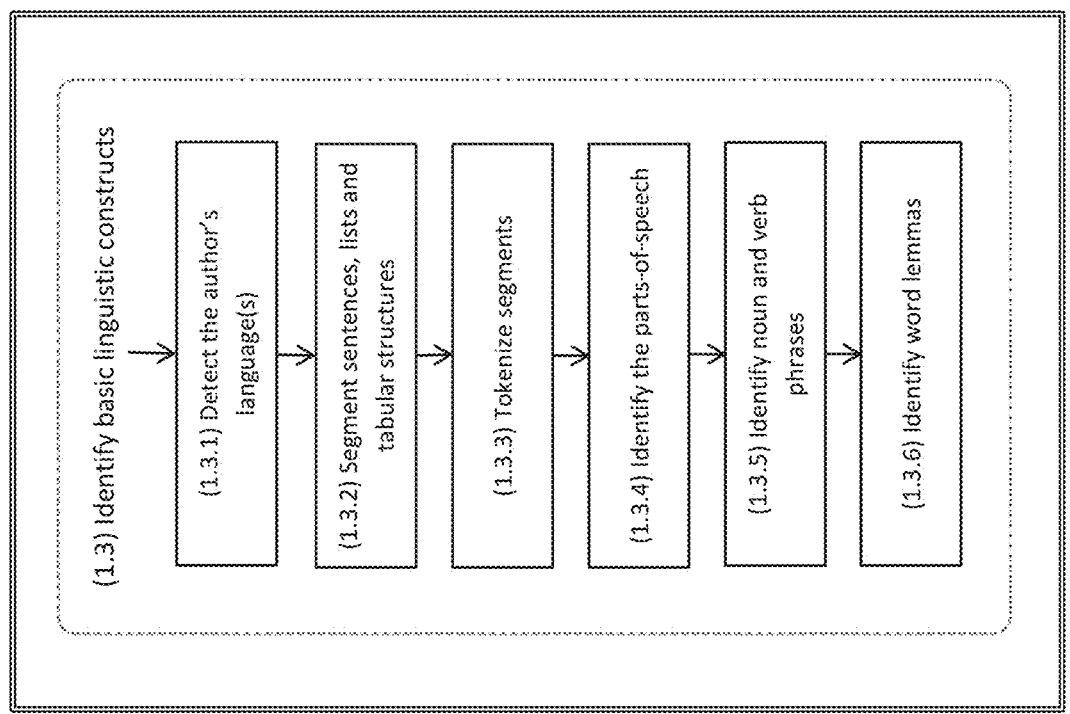

FIG. 24 is a flowchart illustrating more details of sub-step (1.3) Identify basic linguistic constructs, according to an embodiment. The system further segments the core body of the communication into the basic constructs of language. First, based on the detected spoken-language(s), the system segments the sentences, lists and tabular structures. Then the system breaks up the segments further into words and punctuation, designating each by its respective part of speech. Noun and verb phrases are grouped and the lemma of each word is identified. These various language constructs and annotations are the starting point for the natural language algorithms and additional processing performed by the system. These substeps include the following.

(1.3.1) Detect the Author's Language(s)

Based on the core body of the communication, the system statistically calculates a likelihood that it is written in a particular language. If the system cannot sufficiently disambiguate the language, for example in the case where there is little content, if the author is known to the system, the system takes into account the language(s) that that author has used in the past.

(1.3.2) Segment Sentences, Lists and Tabular Structures

Based on the detected language(s), the system divides the core body of the communication into sentences, lists, and tabular data.

(1.3.3) Tokenize Segments

The system breaks each segment into tokens. A token may be a word, a contraction, a punctuation mark, a number, or an emoticon.

(1.3.4) Identify the Parts-of-Speech

For each token in each segment, the system distinguishes its part-of-speech. For words, this includes, but is not limited to, a noun, a pronoun, a verb, an adjective, an adverb, a preposition, a conjunction, an interjection and a determiner. Tokens may also be distinguished as a cardinal, a particular punctuation mark and a symbol, or a particular emoticon.

(1.3.5) Identity Noun and Verb Phrases

For each segment, the system groups the noun phrases and also groups the verb phrases. Noun phrases include determiners, modifiers and nouns. Verb phrases include modals or auxiliaries and a verb.

(1.3.6) Identify Word Lemmas

For nouns, verbs, adjectives and adverbs, the system determines the lemmas for each word. These root forms are later used in other processes.

(1.4) Classify Speech Acts.

The system attempts to identify and classify speech acts within each sentence. The four possible speech acts include:

1. Directive—the author is requesting some particular action
2. Commissive—the author is committing to take some particular action
3. Expressive—the author is expressing some opinion
4. Declarative—the author is stating some claim The method to do this classification is a set of rules in combination with a trained, machine-learned algorithm. Both the rules and the machine-learned algorithm are based on the various features and lexical-syntactical patterns of the sentence, including particular tokens, grammar and punctuation. Using a decision tree and measure of likelihood, the system determines if a speech act can be identified and classified. It should be appreciated that some scholars define a fifth speech act, namely assertive. Some embodiments can utilize this fifth speech act, but we have found that often we obtain similar results without differentiating between Declarative and Assertive speech acts.

(1.5) Identify the Aspects of the Speech Acts

The system then identifies the aspects of the speech acts. Aspects are the "who, what, when and where" of a speech act. Not all speech acts have all aspects. For each speech act classification, these are the descriptions of the associated aspects:

Directive:
 Action: The type of action that is being requested
 Who: a) The person(s) the action is being requested of, and b) The person(s) who are involved in the request
 What: The object of the requested action
 When: The timeframe(s) related to the action
 Where: The location(s) related to the action
Commissive:
 Action: The type of action that is committed
 Who: a) The person(s) whom the commitment is made, and b) The person(s) who are involved in the commitment
 What: The object of the commitment action
 When: The timeframe(s) related to the committed action
 Where: The location(s) related to the committed action
Expressive:
 Who: The person(s) relayed to the opinion
 What: The opinion
 When: The timeframe(s) related to the opinion
 Where: The location(s) related to the opinion
Declarative:
 Who: The person(s) related to the claim
 What: The claim
 When: The timeframe(s) related to the claim
 Where: The location(s) related to the claim Note, the types of actions include, but are not limited to: contact, meet, provide (which includes send), confirm, approve, revise, and advise.

Embodiments identify these aspects by first to identifying the primary verb of the speech act. Then, using a lexicon of verbs, the particular usage of the verb is determined and the specific type of action is identified. Based on the particular type of action, using lexical-syntactical patterns, the aspects are identified.

Figure 25:
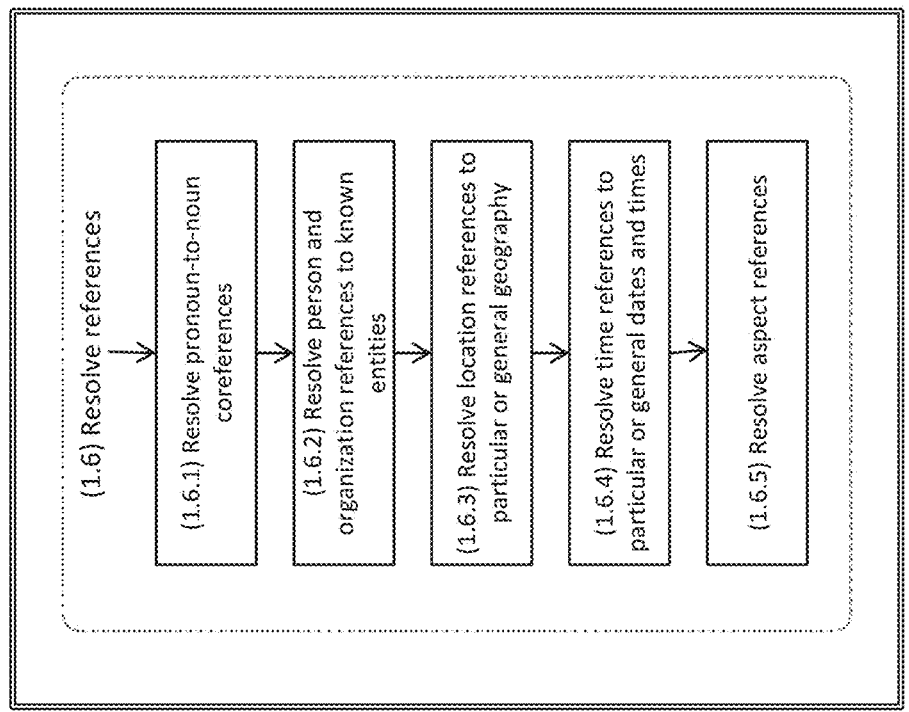

FIG. 25 is a flowchart illustrating more details of sub-step (1.6) Resolve references, according to an embodiment. The system attempts to resolve supposedly vague references. Pronouns are resolved to their corresponding nouns or objects. Aspects of speech acts are resolved to their corresponding entities or objects. Mentions of people, organizations, locations, and time are resolved to known entities, known geography and particular dates and time.

(1.6.1) Resolve Pronoun-to-Noun Coreferences

The system attempts to resolve pronouns to their respective noun references. These references may be within the same sentence or may be in an adjacent or proximate sentence. For example, with the sentence "Joe was pleased with his result.", the possessive pronoun "his" is resolved to the proper noun "Joe".

(1.6.2) Resolve Person and Organization References to Known Entities

The system attempts to resolve each mention of people and organizations within a communication to a known entity. For example a message that mentions "Joe" could be resolved to the known person: Joseph Harrison, Project Manager for ACME Systems Inc. Or, for example a message that mentions "ACME" could be resolved to a known organization: ACME Systems Inc. in Chicago. The method used to resolve these references considers multiple variations of the person or organization name. Since there is a high chance of multiple possible name matches, embodiments use other factors in conjunction with the name to resolve potential ambiguities. For example, using the identities of the other people involved and the subject matter being discussed, the system compares these with the inter-relationships and subject matter discussed by potential candidates in an attempt to weigh the likelihood of each. In the case of unresolvable ambiguity, the system waits for more information to become available, at which time it reassesses for a potential resolution. If such a delay is not possible, the system can flag two or more potential identities so that the user can resolve such an ambiguity.

(1.6.3) Resolve Location References to Particular or General Geography

For mentions of locations within a communication, the system attempts to resolve each to a known geographical coordinate or area. For example, a message that mentions "Ottawa" can be resolved to: Ottawa, Ontario, Canada.

(1.6.4) Resolve Time References to Particular or General Dates and Times

Similarly, for mentions of time within a communication, the system attempts to resolve each to a particular date and/or time. For example, a message written on Feb. 6, 2015 that mentions "next Friday at noon" can be resolved to the date and time: Feb. 13, 2015 at 12:00 PM in the author's time zone.

(1.6.5) Resolve Aspect References

The "who", "when" and "where" aspects of speech acts are resolved using a combination of coreferences resolution (1.6.1), resolution to known entities (1.6.2), location resolution (1.6.3) and time resolution (1.6.4).

In the case when the "what" aspect is a pronoun, the system uses coreference resolution (1.6.1) to identify the corresponding noun phrase. The system then attempts to resolve the noun to a known object or event. In the case of email messages, "it" may be in reference to the email subject or an attachment. For example: "Did you read this?" where "this" is in reference to an attachment.

Figure 26:
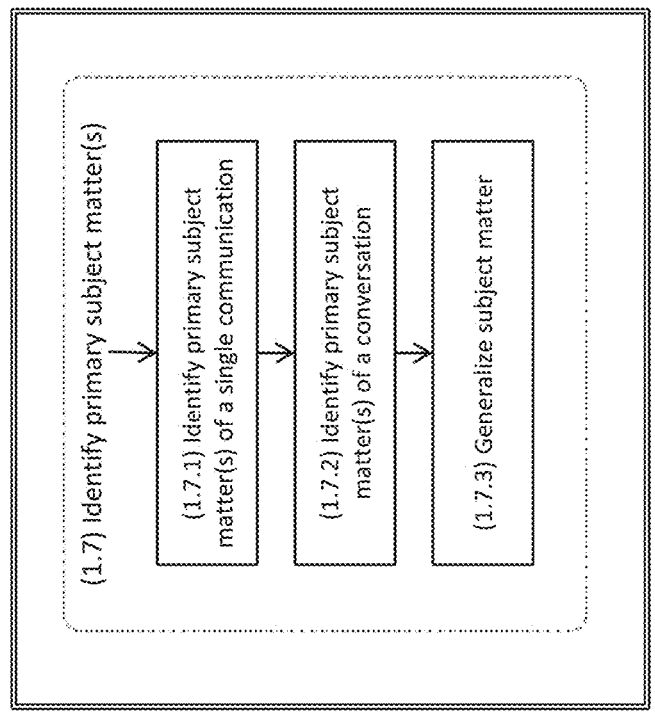

FIG. 26 is a flowchart illustrating more details of sub-step (1.7) Identify primary subject matter(s) according to an embodiment. The system determines the primary subject matter(s) of a communication and of an entire conversation. The subject matters are weighted by their relevance to the communication(s).

(1.7.1) Identify Primary Subject Matter(s) of a Single Communication

The system begins with all noun phrases in the communication. These phrases are shortened to exclude articles and other superfluous words. The system then increases the relevance weighting for those related to the "what" aspects of any speech acts. After lemmatization and coreference resolution, recurrence of each noun phrase is counted and factored in to the relevance weighting. In the case of email messages, the system determines if the email subject contains any useful noun phrases and applies the appropriate relevance weighting.

(1.7.2) Identify Primary Subject Matter(s) of a Conversation

After the system identifies the primary subject matter for each communication, it then re-evaluates the relevance weighting for the entire conversation. In this weighting, the system considers when the subject matter was discussed in the conversation, for example: in the beginning, at the end or throughout. The system also considers subject matter related to speech acts that span multiple communications, for example: a directive and then a follow up commissive.

(1.7.3) Generalize Subject Matter

Various embodiments also perform word-sense disambiguation for the subject matters. For example, "teeth" of a gear is different than "teeth" in your mouth. Then for each distinct meaning, the system attempts to associate each with a generalized concept. For example, "teeth", "dentist", "flossing" could all be related to the concept "dentistry".

(1.8) Measure Emotion and Emphasis

The system measures the degree of emotion or emphasis that is revealed in the authors tone. For example these include:

Happiness/Excitement
Angriness/Frustration
Gratitude/Satisfaction
Regret/Disappointment
Criticality/Seriousness
Urgency/Desperation
Joking or Sarcasm Based on the particular words and punctuation used by the author, varying weights are applied to the corresponding measure. The system alters these weights when used in combination with intensifiers and deminishers, like "very" and "little", and negators, like "not" and "never". The system also considers emoticons when measuring emotion and emphasis.

Because different people have different levels of intensity when communicating, the system calculates normalized measures and trends for each person. This is later used to contrast and detect uncharacteristic communications. Such uncharacteristic communications can be flagged to appropriate users, e.g., when an important customer is complaining, the customer representative for that customer can be notified.

Figure 27:
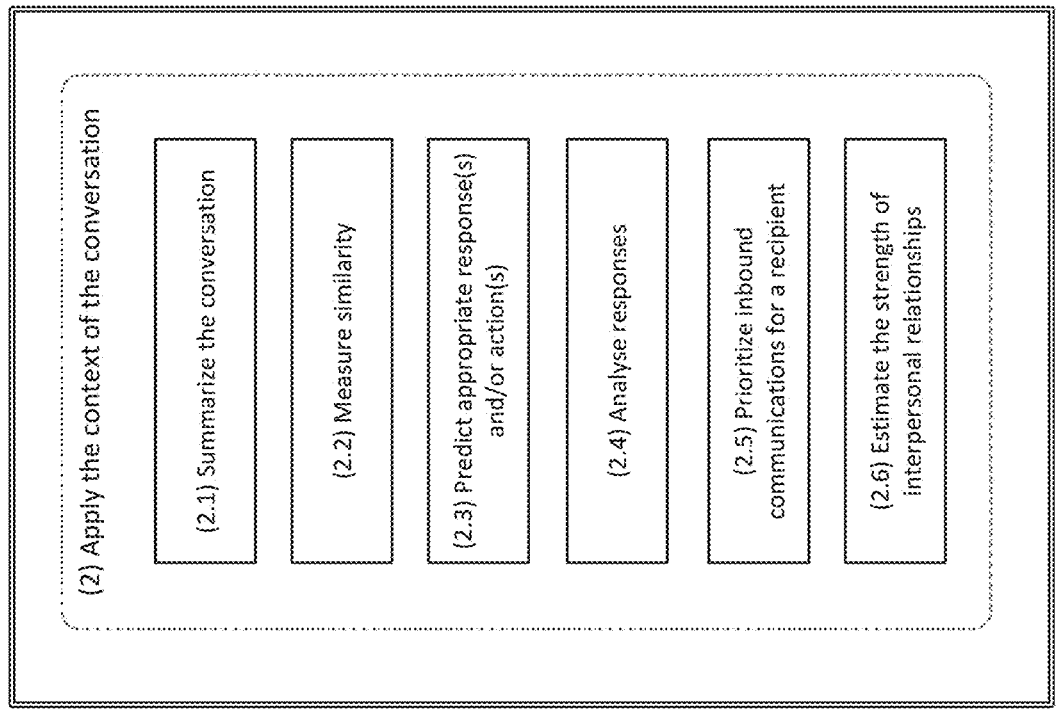

FIG. 27 is a flowchart illustrating more details of step (2) Apply the context of the conversation, according to an embodiment.

(2.1) Summarize the Conversation

Using the primary subject matters and any identified speech acts, the system can summarize a conversation into a shortened description. This summary includes a semi-generative portrayal of the timeline of noteworthy events. These events may include:

1. Any requests and questions with their respective responses, along with who asked and who responded,
2. Any noteworthy statements related to the primary subject matter(s) along with who made them,
3. Any uncharacteristic emotions, from whom, and directed towards whom, and
4. Any digital assets which were included.

The summary also may include:

5. An account of who was involved and to what degree they participated.
6. An account of what organization(s) they represented and in what role, if available, and
7. A description of the timespan of the conversation.

(2.2) Measure Similarity

The system evaluates similarity of conversations across multiple dimensions. For example:

1. The people involved: two conversations are considered more similar if they involve some of the same people.
2. The time the conversation occurred: two conversations are considered more similar if they occurred within a short timeframe or have an overlapping timeframe.
3. The subject matter(s) that was discussed: two conversations are considered more similar if they discuss more of the same subject matter(s) and/or related subject matter(s).
4. The digital assets that were included: two conversations are considered more similar if they included the same or a version of a given asset digital asset, or, in a lesser respect, if they include a similar digital asset.

(2.3) Predict Appropriate Response(s) and/or Action(s)

Based on the action type of a directive, the system generates and evaluates the most appropriate response and/or action for the recipient(s). Suggested responses and actions may include:

1. Respond positively or negatively
Yes/No
Confirm/Reject
Approve/Deny
Agree/Disagree
2. Provide information and/or advise
3. Send a document
4. Review and/or provide feedback
5. Respond with availability
6. Follow up.

(2.4) Analyze Responses

In the event that a response is made to a previous directive, the system generates and evaluates the most appropriate response and/or action for that response. Responses and actions may include:

1. If the response is another directive, for example a question followed up by another question, the system predicts the appropriate response(s) and/or action(s) for the directive as per 2.3,
2. If the response is a reply to availability, the system decides whether a calendar event can be made or if additional arrangements are required, and
3. If the response is positive or negative, the system determines if a follow up communication is necessary.

(2.5) Prioritize Inbound Communications for a Recipient

For a given recipient, the system prioritizes inbound communications, for example based on:

1. The explicit or implicit importance of the communication to the recipient,
2. The topical relevance that a communication has to a recipient's recent activities, and
3. The explicit or implicit urgency of a communication.

For importance, the system considers who the author of the communication is and what their relation is to the recipient. For example, the system considers:

1. Whether the author is someone whom the recipient has recently and frequently communicated,
2. The current strength of the interpersonal relationship between the author and the recipient, and
3. any explicit or implied seniority that the author may have with the recipient and vice versa.

Also, for importance, the system considers the author's emotion or emphasis. For example, the system will increase the priority of a communication if it detects that the author is expressing criticality within the communication or has explicitly designated the communication as "important" by means of an attribute of the communication.

For relevance, the system compares the recipient's recent communication activities with each inbound communication. Inbound communications that have subject matter similarity to other recent communications are considered more relevant and are given a higher priority. More priority is given to inbound communications that have subject matter similarity to recent communications that were sent by the recipient.

For urgency, the system considers the author's emotion or emphasis. For example, the system will increase the priority of a communication if it detects that the author is expressing urgency related to a directive or has explicitly designated the communication as "urgent" by means of an attribute of the communication.

Also for urgency, the system will identify and resolve literal due date references with respect to a directive, and as that date/time approaches, the system will increase its priority. Additionally an inbound communication is considered more urgent if it is a response to a previous communication from the recipient and was deemed urgent.

(2.6) Estimate the Strength of Interpersonal Relationships

In order to estimate the strength of the relationship between two people, the system considers multiple factors, e.g.:

1. the number of communications exchanged within a time period,
2. the number of one-on-one communications exchanged within a time period,
3. the proportions of one-on-one communications replied to within a short time period,
4. the number of communications both people received within a time period,
5. the number of meetings together within a time period,
6. the number of one-on-one meetings together within a time period,
7. the recency and trending frequency of communications,
8. the regularity or of variability of the frequency of communications,
9. the nature of the communications with respect to delegation, requests for expertise, and commitments, and
10. the frequency of uncharacteristic emotions expressed in communications.

These factors are combined and tracked over time to provide an up-to-date estimate of a given interpersonal relationship. Further, as stated above, the history of inter-personal communications can help resolve ambiguities in any given communication Further it should be appreciated that additional sources of information need not be email. Some embodiments can integrate with an individual's calendar, phone, voice and text messaging and social media to help derive contextual information, including help resolve any ambiguities.

Some embodiments include an assistance engine, such that once the context has been resolved, the assistant engine can automatically take certain actions, or depending on how the system is configured, prepare a draft action for the user to review and possibly modify before accepting (at which point the system will take the action).

We will discuss by means of example four primary use cases for such an assistance engine:

Use Case 1.1: Assist with an informal meeting request
Use Case 1.2: Assist in answering a Yes/No question
Use Case 1.3: Assist in contacting a person
Use Case 1.4: Assist in sending a file
Use Case 1.1: Assist with an Informal Meeting Request When a message contains a directive that is requesting the user's availability, a.k.a. an informal meeting request, the system assists the recipient in responding. An informal meeting request may or may not have any of these components:

1. a specific date,
2. a specific time, or
3. a specific duration.

In order to create a calendar event, the system requires all three components. In the absence of one or more, the system either:

1. makes some probable assumptions,
2. tries to resolve specifics from previous messages in the conversation, or
3. prompts the recipient to resolve.

The following are eight exemplary scenarios with varying degrees of specifics provided:

| Scenario | Example | A. Date | B. Time | C. Duration |
|---|---|---|---|---|
| 1.1.01 | "Do you have two hours for me tomorrow at 2?" | ✓ | ✓ | ✓ |
| 1.1.02 | "Lunch tomorrow?" | ✓ | ✓ | x |
| 1.1.03 | "Can you meet on Thursday for a half hour?" | ✓ | x | ✓ |
| 1.1.04 | "Can you meet on Thursday?" | ✓ | x | x |
| 1.1.05 | "What about 3:00 for 15 minutes?" | x | ✓ | ✓ |
| 1.1.06 | "What about 4:00?" | x | ✓ | x |
| 1.1.07 | "Can I get an hour from you sometime?" | x | x | ✓ |
| 1.1.08 | "Can we set up a time to review this?" | x | x | x |

Compounded on these scenarios, additional considerations include: time restrictions, options and recurrences.

| Scenario | Example | Comments |
|---|---|---|
| 1.1.09a | "Can you make time tomorrow morning?" "What about next month?" | Time restrictions (upper and lower bound) |
| 1.1.09b | "Are you available sometime before Friday?" "Can we meet this week?" | Time restriction (upper but no lower bound) |
| 1.1.10 | "Can you join me today from 8-10 or 2-4?" "What about Monday or Tuesday?" | Multiple options |
| 1.1.11 | "Can we meet up the next three Fridays for lunch?" "What about every Monday at 9?" | Recurrence |

Not all dates, times and durations will come from the message that contains the directive—that message may be in response to other message(s) that did specify a date, time or duration (or restriction).

For example:

1. "Sure. What about 4:00?" and a previous message said "How's Monday?"
2. "Does 4:00 work for you then?" and a previous message said "Tomorrow at 3:00?" which had the negative response "No I'm booked then."

General Assumptions:

When duration is not specified, the system assumes the duration is one hour. This can be configured depending on user involved and their typical meeting duration.

When AM or PM is not specified (and there are no other indicators like "morning", "afternoon", or "evening"), the system assumes a 7:00 AM to 6:00 PM work day.

| What is written | "12:00" . . . "6:59" | "7:00" . . . "11:59" |
|---|---|---|
| What the system guesses | 1:00PM . . . 6:59PM* | 7:00AM . . . 11:59AM* |

*In the case of references between "6:00" and "9:00" (the most ambiguous timeframe), the system highlights to the user that it has assumed AM over PM or vice versa.

It should be appreciate that the system can similarly resolve such phrases as:

"Beginning of the month"
"End of the day"—assume work day
"End of the week"—assume work week
Time zones Given these scenarios, the following tables illustrate how embodiments could use the assistance engine:

| Scenario 1.1.01 | A message contains a directive that requests availability and specifies: date ✓ time ✓ duration ✓ |
|---|---|
| Example(s) | "Can you meet on Thursday from 4 to 5?" "Does noon 'til 1:30 next Monday work for you?" "Do you have two hours for me tomorrow at 2?" |
| Assumption(s) | None |
| Action by Assistance Engine | If their calendar has availability at that specific date, time, and duration: 1. The system prompts the user to confirm the sending of a meeting request for that date, time and duration 2. The user has the option to change the time block and/or edit the message and/or change the recipients before sending. If their calendar does not have availability at that date, time, and duration: 1. The system suggests the nearest time block of availability (before or after), with an indication that it is not the requested time. 2. The user has the option to: a. send a meeting request for that new date, time and duration, or b. select a number of time blocks of availability and send a preformed email suggesting these time blocks |

| | |
|---|---|
| Scenario 1.1.02 | A message contains a directive that requests availability and specifies:<br>date ✓    time ✓    duration x |
| Example(s) | "Lunch tomorrow?"<br>"How's 9:00 this Wednesday?" |
| Assumption(s) | 1. Assume the duration is one hour. |
| Action by Assistance Engine | Same as scenario 1.1.01 but with the above assumption. |

| | |
|---|---|
| Scenario 1.1.03 | A message contains a directive that requests availability and specifies:<br>date ✓    time x    duration ✓ |
| Example(s) | "Can you meet with me on Thursday for a half hour?" |
| Assumption(s) | None |
| Action by Assistance Engine | 1. The system provides the user with a list of availability options with the specified time duration for that specific date<br>2. The user can opt to:<br>  a. Send this list<br>  b. Choose some time blocks<br>  c. Choose one time block<br>  d. Choose one time block and send as a meeting request<br>3. The user can edit the message and/or change the recipients before sending. |

| | |
|---|---|
| Scenario 1.1.04 | A message contains a directive that requests availability and specifies:<br>date ✓    time x    duration x |
| Example(s) | "Can you meet on Thursday?" |
| Assumption(s) | 1. Assume the duration is one hour. |
| Action by Assistance Engine | Same as Scenario 1.1.03 with the above assumption. |

| | |
|---|---|
| Scenario 1.1.05 | A message contains a directive that requests availability and specifies:<br>date x    time ✓    duration ✓ |
| Example(s) | "What about 3:00 for 15 minutes?" |
| Assumption(s) | 1. If the current time is before the time specified then assume the date is today.<br>Else (the current time is after the specified time) assume the date is tomorrow. |
| Action by Assistance Engine | Same as Scenario 1.1.01 with the above assumption. |

| | |
|---|---|
| Scenario 1.1.06 | A message contains a directive that requests availability and specifies:<br>date x    time ✓    duration x |
| Example(s) | "What about 4:00?" |
| Assumption(s) | 1. Assume the duration is one hour. |
| Action by Assistance Engine | Same as Scenario 1.1.05 with the above assumption. |

For both of the above examples, the system would not assume today or tomorrow if an actual date can be resolved (for example from an earlier email in a thread).

| | |
|---|---|
| Scenario 1.1.07 | A message contains a directive that requests availability and specifies:<br>date x    time x    duration ✓ |
| Example(s) | "Can I get an hour from you sometime?" |
| Assumption(s) | 1. The date and time are the current date and time (i.e. as soon as possible). |
| Action by Assistance Engine | Same as Scenario 1.1.01 with the above assumption. |

| | |
|---|---|
| Scenario 1.1.08 | A message contains a directive that requests availability and specifies:<br>date x    time x    duration x |
| Example(s) | "Can we meet up sometime soon?" |
| Assumption(s) | 1. Assume the duration is one hour. |
| Action by Assistance Engine | Same as scenario 1.1.07 with the above assumption. |

| | |
|---|---|
| Scenario 1.1.09a | A message contains a directive that requests availability with a time restriction. |
| Example(s) | "Can you make time tomorrow morning?"<br>"What about next month?" |
| Assumption(s) | None |
| Action by Assistance Engine | 1. See other scenarios above depending on if date and/or time and/or duration was specified.<br>2. Allow the user to choose a time block, however if they choose a time block outside of the upper and lower bounds of the time restriction, then warn them. |

| | |
|---|---|
| Scenario 1.1.09b | A message contains a directive that requests availability with a time restriction, but not a lower bound. |
| Example(s) | "Are you available sometime before Friday?"<br>"Can we meet this week?" |
| Assumption(s) | 1. The lower bound of the time restriction is the current time. |
| Action by Assistance Engine | Same as Scenario 1.1.09a with the above assumption. |

| | |
|---|---|
| Scenario 1.1.10 | A message contains a directive that requests availability with multiple options. |
| Example(s) | "Can you join me today from 8-10 or 2-4?"<br>"What about Monday or Tuesday?" |
| Assumption(s) | None |
| Action by Assistance Engine | The system iterates through the options and proposes the earliest option based on the user's availability as per the scenarios above depending on if date and/or time and/or duration was specified. |

| | |
|---|---|
| Scenario 1.1.11 | A message contains a directive that requests availability for a recurring time block. |
| Example(s) | "Can we meet up the next three Fridays for lunch?"<br>"What about every Monday at 9?" |
| Assumption(s) | None |
| Action by Assistance Engine | The system reviews the first occurrence with the user as per the scenarios above depending on if date and/or time and/or duration was specified. Then the system allows the user to include recurrence if desired. |

| | |
|---|---|
| Scenario 1.1.12 | A message contains a directive that requests availability but no location is specified. |
| Example(s) | |
| Assumption(s) | None |
| Action by Assistance Engine | The system reviews the scheduling of the meeting request with the user as per the scenarios above, and allows the user to specify a location. |

| | |
|---|---|
| Scenario 1.1.13 | A message contains a directive that requests availability for a meeting at a physical location. |
| Example(s) | "Can you meet at Starbucks tomorrow morning?" |
| Assumption(s) | None |
| Action by Assistance Engine | The system reviews the scheduling of the meeting request with the user as per the scenarios above, and prepopulates the meeting request location as the location mentioned. |

| | |
|---|---|
| Scenario 1.1.14a | A message contains a directive that requests availability for a virtual meeting but the details are missing or cannot be determined. |
| Example(s) | |
| Assumption(s) | None |
| Action by Assistance Engine | The system reviews the scheduling of the meeting request with the user as per the scenarios above, and prepopulates the meeting request location as a type of virtual meeting location. For example: "Teleconference", "Telephone", "Skype", etc. |

| | |
|---|---|
| Scenario 1.1.14b | A message contains a directive that requests availability for a virtual meeting with known details. |
| Example(s) | |
| Assumption(s) | None |
| Result of the Magic Button | Same as scenario 1.1.14a, plus the system includes the details of the virtual meeting as the body/description of the meeting request. |

| | |
|---|---|
| Scenario 1.1.14c | A message contains a directive that requests availability for a virtual meeting between the sender and the receiver. |
| Example(s) | "Call me on Thursday."<br>"Can I skype you sometime Monday morning?" |
| Assumption(s) | None |
| Action by Assistance Engine | The system attempts to ascertain who will initiate the connection . . . , i.e. "contactor" vs. "contactee" If the user is the designated contactor, the system determines the mode of communication and then attempts to extract the appropriate details from that person's contact information to facilitate the communication. |
| Comments | So in the first example above, the system will schedule the recipient to call the sender (and possibly try to either ascertain a time, or if the user wants, send an email to determine one). In the second example, the system will know the sender will be the contactor, and the communication medium will be Skype, and will respond with a time and the user's Skype information (unless the system can resolve the sender will not need that information). |

Further factors that can be considered include blocking time in calendar, any indicated geolocation of meeting, geolocation of previous meeting and current geolocation.

Use Case 1.2: Assist in Answering a Yes/No Question

When a message contains a directive that asks a question that can be answered with either a "yes" or a "no", the system assists the recipient in responding.

| | |
|---|---|
| Scenario 1.2.01 | A message contains a directive that asks a question that can be answered with either a "yes" or a "no". |
| Example(s) | "Do you want me to ship the package?" |
| Assumption(s) | None |
| Action by Assistance Engine | 1. The system prompts to respond with Yes or No, or the option to respond with Yes or No but first edit the message<br>a. Yes or No - The system generates a preformatted reply and automatically sends.<br>b. . . . with edit message - Allow the user to first edit the message and/or change the recipients before sending. |

Use Case 1.3: Assist in Contacting a Person

When a message contains a directive that is requesting the recipient to contact a person, the system assists the recipient in responding.

| | |
|---|---|
| Scenario 1.3.01 | A message contains a directive that is requesting the recipient to contact the sender by telephone. |
| Example(s) | "Give me a call." |
| Assumption(s) | None. |
| Action by Assistance Engine | 1. Display that person's telephone information.<br>2. If multiple phone numbers, allow the user to choose which phone number.<br>3. Allow the user to initiate the call. |

| | |
|---|---|
| Scenario 1.3.02 | A message contains a directive that requests for the recipient to contact the sender but either does not specify the preferred mode of communication or specifies a mode of communication which the system does not recognize/support. |
| Example(s) | "Let me know when you're ready."<br>"Message me when you're ready."<br>"Text me when you're ready."<br>"Skype me when you're ready." |
| Assumption(s) | None |
| Action by Assistance Engine | 1. Displays that person's contact information.<br>2. Allows the user to choose their choice of mode of contact.<br>3. Allows the user to initiate contact. |

| | |
|---|---|
| Scenario 1.3.03 | A message contains a directive that requests for the recipient to contact someone by telephone. |
| Example(s) | "Call Joe about that." |
| Assumption(s) | None |
| Action by Assistance Engine | If the person reference is ambiguous:<br>1. If there are multiple matches, display a list of contacts that best match.<br>Else display entire contact list<br>2. Allow the user to select a person.<br>Then proceed to Scenario 1.3.01. |

| | |
|---|---|
| Scenario 1.3.04 | A message contains a directive that requests for the recipient to contact someone but either does not specify the preferred mode of communication or specifies a mode of communication which the system does not recognize/support. |
| Example(s) | "Contact Joe about that ." |
| Assumption(s) | None |
| Action by Assistance Engine | If the person reference is ambiguous:<br>1. If there are multiple matches, display a list of contacts that best match.<br>Else display entire contact list<br>2. Allow the user to select a person.<br>Then proceed to Scenario 1.3.02. |

Use Case 1.4: Assist in Sending a File

When a message contains a directive that is requesting the recipient to send a file to someone, the system assists the recipient in responding.

| | |
|---|---|
| Scenario 1.4.01 | A message contains a directive that requests the recipient to send a file to the recipient. |
| Example(s) | "Could you send me your resume?" |
| Assumption(s) | None |
| Action by Assistance Engine | The system:<br>1. Generates a "Reply to All" email with a preformatted response.<br>2. Prompts with a list of possible attachments.<br>3. Allows the user to optionally browse if the file is not in the list.<br>4. Allows the user to optionally preview a single file.<br>5. Allows the user to select a file for attachment.<br>6. Allows the user to optionally edit the message and/or change the recipients before sending. |

| | |
|---|---|
| Scenario 1.4.02 | A message contains a directive that requests the recipient to send a file to someone else. |
| Example(s) | "Could you send your resume to Joe?" |
| Assumption(s) | None |
| Action by Assistance Engine | The system:<br>1. Generates an email with a preformatted response.<br>2. If the system was not able to resolve the person reference to a single person, the system prompts the user with a list of options - and allows the user to browse their contact list for someone else.<br>3. Same as Scenario 1.4.01, steps #2-6 |

It should be noted that while some of the examples above relate to processing and acting on individual emails, some embodiments provide an advantage of analyzing conversations or threads as a whole. Some embodiments will even correlate with related conversations. Further, while some of the examples above discuss the use of the assistance engine for assisting a user, the assistance engine in some embodiments can act on a group or organization wide level. As but one example, let us assume there was a thread between a customer and a supplier which talked about a meeting which took place in a prior week. Let us further assume the customer did not receive a document which they were expecting, and after a week or two, one of their managers wrote to a manager on the supplier side, stating "It was good to meet your team the other day. Just a friendly reminder we are still waiting for the document which was promised". The system would determine based on such factors as the sender, the recipient and the calendar of the recipient, which meeting is being discussed, and locate the minutes of the meeting. Further, assume minutes were done in a hurry, and included a seemingly ambiguous line stating "she would send it to him". However, based on the attendees, and the system's analysis of the attendees, and the topics discussed, the system will determine who "she", "it" and "him" are. One possible response would be for the assistance engine to simply send the appropriate document on behalf of the manager (recipient mentioned above). However, another scenario would be for the system to draft an email from "she" to "him", copying the respective managers above, and enclosing the appropriate document. This feature could be selected by the manager who wants to foster the relationship between "she" and "him".

Further, as already stated, the system can fully integrate email and calendar functionality. So in this case, not only can the system automatically generate a draft email from the above referenced "she", but it will add a sentence referencing their commitment to send the document at the meeting, indicating the meeting date, and add an apology based on the fact "she" had been on vacation since the meeting (which the system can determine for her calendar).

Accordingly, this is but one example of how such a system can resolve the "who", "what" and "when" of a conversation. In this example, the system was able to resolve the people involved, that there was a request, which was a follow-up from a previous commitment and facilitated taking the appropriate action to comply with the both the request and action, based on determining the timelines involved to resolve the meeting which was mentioned.

Depending on the nature of the role of the recipient, the assistance engine can perform other functions, either for the user, or the organization, or both. For example, many professionals, including lawyers and accountants, need to organize communications by file (with the classic example being a file system which designates the client and the matter). Accordingly, an assistance engine can analyze all messages to either automatically determine to which file (or files) a message should be assigned, or to present options to the user if the file cannot be unambiguously ascertained. As but one example, two communicators may often communicate about a certain client. Many of these communications will explicitly reference the file number in the subject. However, from time to time, one of the communicators will forget to reference the file number in a new communication. If over the last two month period, their communications have been about a particular matter, the system can be configured to automatically assign the message to that file. Alternatively, the system can prompt the user suggesting that file number, but have them confirm.

2. Prioritization

The personal assistance engine can also be used to help prioritize incoming communications. We will discuss one example embodiment, in which four factors are considered when determining relative priority of an inbound message:

1. The apparent relevance of the message,
2. The apparent importance of the message,
3. If applicable, the urgency related to a request if any, and
4. The delivery time of the message.

Generally, a message with a high weighting of relevance, a high weighting of importance, a recent delivery time and a high weighting of urgency, is designated a higher priority. In contrast, a message with a low weighting of relevance, a low weighting of importance, an older delivery time and no urgency, is designated a lower priority.

The following is an example application that uses these priority-oriented measures to assist the user in determining which inbound messages require first attention. The application first performs an initial sorting based on each message's relevance. If the relevance measure of a message meets a desired threshold, the system then considers importance and urgency. Those that meet a threshold of importance or urgency are highlighted to the user in reverse chronological order of the delivery time. The system prominently highlights those messages that meet both the threshold for importance and the threshold for urgency.

2.1. Relevance

The relevance of a message is gauged and weighted by the system. The system maintains a rolling inventory of the most recent, most frequently discussed, most significant subject matters for the given user. This includes the primary subject matters of messages sent by the user, as well as the primary subject matters of the inbound messages that the user has responded to. Subject matter of inbound messages that are not a part of a conversation that the user has not contributed to, have lesser significance in this rolling inventory. The system then uses this inventory to measure how "current" each subject matter of the new inbound messages is. More current and more significant subject matter contribute more to the relevance weighting of that message.

2.2. Importance

The importance of a message is gauged and weighted by the system using multiple indicators. These include:

1. Who the sender of the message is to the user,
2. For email messages, if the message was sent directly to (To), carbon copied (CC), or blind carbon copied (BCC) to the user,
3. If the sender's semantics in the message suggest importance or criticality,
4. If the message is denoted as important by the sender,
5. If the user has indicated in the past that messages like this one are important, and
6. If a previous message(s) that this message was in response to, if any, was deemed important.

2.2.1. Who the Sender is

The system considers who the sender of the message is to the user, including:

1. If the sender and the user have a strong relationship,
2. If the sender is in a place of authority with respect to the user, and
3. If applicable, if the sender's organization has significance to the user's organization, 2.2.1.1 Relationship If the system has determined that the sender of the message has a strong relationship with the user, a higher importance weighting is assigned. In order to estimate the strength of the relationship between two people, the system considers multiple factors, which can include:

the number of communications exchanged within a time period, the number of one-on-one communications exchanged within a time period, the proportions of one-on-one communications replied to within a short time period, the number of communications both people received within a time period, the number of meetings together within a time period, the number of one-on-one meetings together within a time period, the recency and trending frequency of communications, the regularity or of variability of the frequency of communications, the nature of the communications with respect to delegation, requests for expertise, and commitments, and the frequency of uncharacteristic emotions expressed in communications.

These factors are combined and tracked over time to provide an up-to-date estimate of a given interpersonal relationship.

2.2.1.2. Authority

Also, if it is known to the system that the sender is in a position of authority with respect to the user, a higher importance weight is assigned.

2.2.1.3. Sender's Organization

Also, if the sender is external to the user's organization, and if it is known to the system that that external organization has considerable significance to the user's organization, for example a key customer or critical vendor, then a higher importance weighting is assigned.

2.2.2. To, CC, BBC

An email message sent directly to the user (To) is weighted as more important than if it was carbon copied (CC) or blind carbon copied (BCC).

2.2.3. Implied Importance

Based on the particular words and punctuation used by the author, varying measures can be applied to the importance weighting. The system alters these measures when used in combination with intensifiers and diminishers, like "very" and "little", and negators, like "not" and "never". Because different people have different levels of intensity when communicating importance, the system calculates normalized measures and trends for each person. This is later used to contrast and detect uncharacteristic emphasis of importance.

2.2.4. Denoted Importance

If the sender used a function of their messaging system to indicate a message as "important" or "critical", then a higher importance weighting is assigned.

2.2.5. User Feedback

If the user has indicated to the system that a message was important, then the system will consider messages of similar characteristics (same sender, same sender organization) to be of higher importance weighting.

2.2.6. In Response to Importance

Additionally, an inbound communication is considered important if it is in response to a previous communication from the recipient and was deemed important.

2.3. Urgency

The urgency of a message is gauged and weighted by the system using multiple indicators. These include:

1. Any implied urgency in the message,
2. Any explicit urgency in the message,
3. The message is denoted as urgent by the sender, and
4. The urgency of a previous message.

2.3.1. Implied Urgency

When the system detects a directive speech act in the message, it also considers the author's emotion or emphasis. For example, the system will increase the urgency weighting of a communication if it detects that the author is expressing urgency related to a directive. The system alters these measures when used in combination with intensifiers and deminishers, like "very" and "little", and negators, like "not" and "never". Because different people have different levels of intensity when communicating urgency, the system calculates normalized measures and trends for each person. This is later used to contrast and detect uncharacteristic emphasis or urgency.

2.3.2. Explicit Urgency

Also, when the system detects a directive speech act in the message, it attempts to identify and resolve literal due date references with respect to the directive, and as that date/time approaches, the system increases its urgency weighting.

2.3.3. Denoted Urgency

If the sender explicitly designated the message as "urgent" by means of a function of their messaging system, then a higher urgency weighting is assigned.

2.3.4. In Response to Urgency

Additionally an inbound communication is considered more urgent if it is in response to a previous communication from the recipient and was deemed urgent.

2.4. Delivery Time

The delivery time of a message is when a message is received by the system. More recently arrived messages are weighted higher.

Another application is to use the context information derived by the system to help improve outgoing communications. Current tools including spell checking, auto-correction, and grammar checking can be improved by utilizing the context to ensure suggestions or auto-corrections are made which are consistent with the context of the communication being composed by the user. This can be useful both for correcting typing errors, or errors made by dictation.

It should be appreciated that the concepts discussed herein are not limited to processing communications. The concepts discussed herein have other applications. One such application is for using the NLP and other concepts discussed herein to act as a better search engine. One advantage of such embodiments is that users will not need to be concerned with how to sort and file emails/documents, or even determine the appropriate keywords for a search query. They can simply ask questions in plain English (or other language) and the system will use natural language processing to provide suitable responses. Further, as stated above, the response need not be limited to an answer, but can involve actions as well, such as sending documents, booking meetings, making travel arrangements, etc.

The preceding features and embodiments may be implemented using hardware only, but will more likely be implemented using software and a universal hardware platform. Based on such understandings, the technical solutions described herein may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a processor to install the software modules, allocate appropriate storage resources, and execute the methods described.

One possible implementation would involve embodiments which act as an add on to a user's email, calendar and messaging applications. Another embodiment is an integrated package which includes the features described herein, integrated with an email/calendar/messaging application. It should be noted that this may be useful for individual users. However, other embodiments can add features which can be used for groups of users. For example, embodiments can include client portion for each user and one or more central portions for working on an organization (including group/department/company) wide basis. As but one example, such embodiments can include communication interfaces for interacting with remote storage, for storing information for a plurality of users. Such a system would have many benefits, as the information obtained from one user, may be useful in resolving context in communications for other users, especially if they work together.

Further such an organization wide system can be used to implement additional features. Applications of this system may include, but are not limited to:
1. Personal Assistant
Automatic task generation
Assistive search
Suggestive discovery
Organization
2. Interpersonal connection discovery
Sales leads
Job placement
Online dating
3. Human Resources and behavioural analytics
Communication channels
4. eDiscovery and investigation
5. Surveillance
Fraud detection
Email message blocking and interception
6. Targeted advertising
7. Responding to Access to Information requests As another example, by doing this on an organization wide level, managers can keep track of trends, by determining the topics being discussed, with what frequency, by how many people, in which groups, and involving which outside parties. Further, customer service can be improved, as such systems can help identify complaints, or delays, or other issues.

Another embodiment allows for an organization chart for an organization (or sub group), which identifies subject matter experts. Typically organization charts are hierarchical in nature, indicating who reports to whom. However, this doesn't always inform people in an organization whom best to contact for a particular issue. However, by storing contextualized information it is now possible for people to search to determine who has interacted (the most) with particular people (at customers, suppliers, etc.) or who has answered the most enquiries about a topic, etc.

A digital communication (email, chat, texting, etc.) can contain semantic references to particular digital artifacts (computer files) that are known to the author and/or reader. The specific syntax, semantics and circumstance of the communication provide the reader context as what artifact the author might be referring to. A system, according to an embodiment, processes one or more digital communications in order to identify references to artifacts, extract context as it relates to a reference, and then attempts to match this context, as criteria, against a collection(s) of known digital artifacts. Them, by providing a single or set of matching candidates, the system (via a display) assists the reader in more quickly identify and accessing said digital artifact(s).

Figure 28:
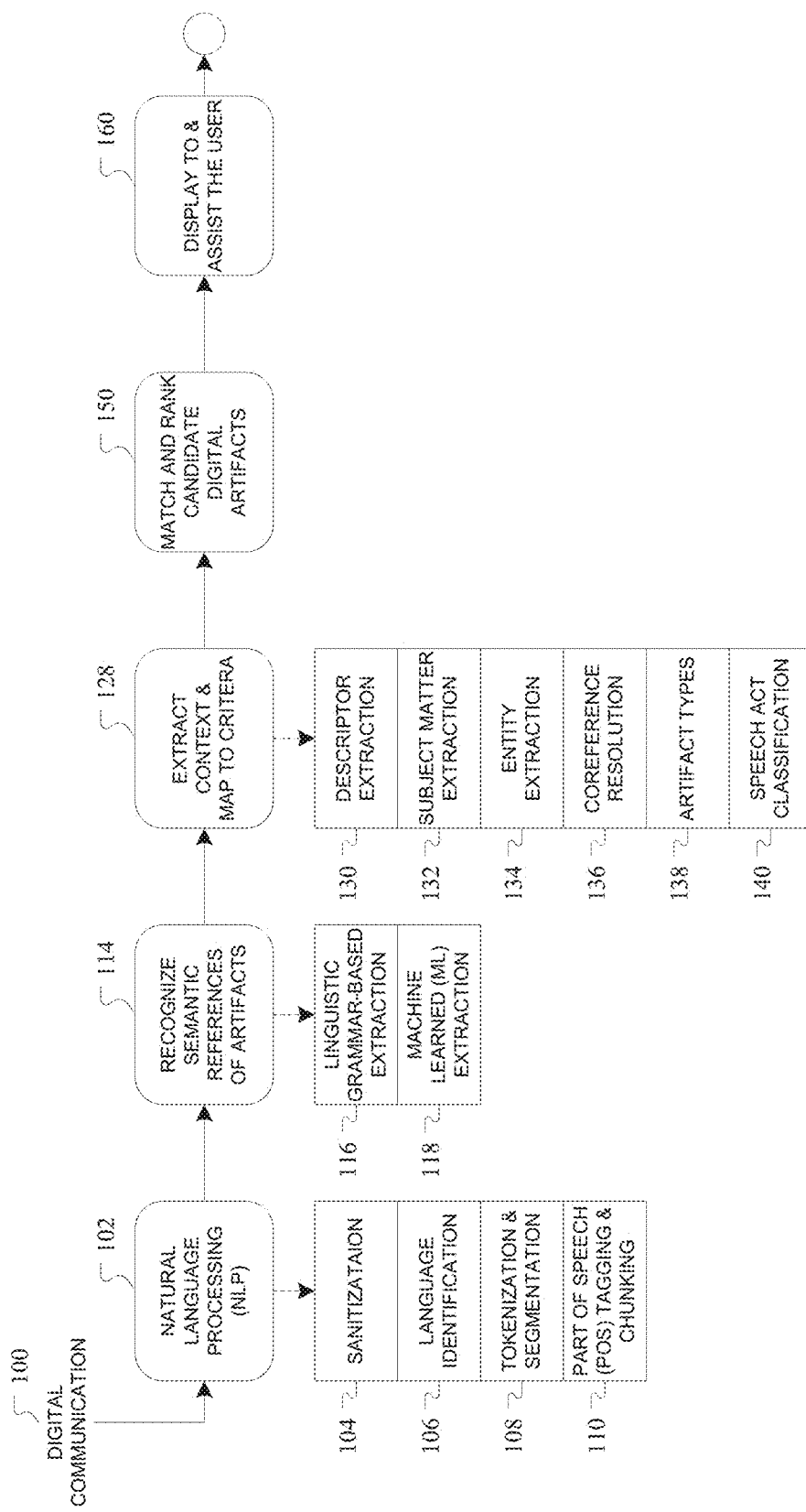
FIG. 28 is a flowchart illustrating the method steps according to an embodiment.

FIG. 28 is a flowchart illustrating the method for a system to identify semantic references to artifacts within digital communications, according to an embodiment. The system attempts to resolve those references to particular digital artifacts, and assist a user in making a correlation.

A digital communication 100 may or may not contain a semantic reference to an artifact. If a digital communication includes any artifacts, for example, an attachment with an email communication, those artifacts can be processed and indexed in the same manner as the user's other digital artifact collection(s). For artifacts that contain text, or have text extracted from them using optical character recognition (OCR), this processing and indexing may include keyword indexing, subject matter extraction, named-entity recognition, document classification, etc. For artifacts that are images, or contain images in part, this processing and indexing may include image recognition and tagging.

In the Natural Language Processing (NLP) step 102 the text of the digital communication can be parsed and annotated. Within this step, the text can be first sanitized 104 so as to remove or replace any elements of the text that may interfere with later NLP processing. The language of the text can then be identified 106 so that subsequent NLP processing operates using the corresponding linguistic, lexical and syntactic patterns. The text can then be annotated so as to distinguish each of the tokens (e.g. words, numbers, punctuation, etc.) and each of the segments (e.g. sentences, sentence fragments, etc.) 108. Next, the grammatical parts of speech (POS) (e.g. noun, verb, adjective, etc.) and the short phrase chunks (noun phrase, verb phrase, etc.) can be annotated 110.

In order to recognize any semantic references of digital artifacts within the text 114, multiple asynchronous processes can be utilized. These processes can include: linguistic grammar-based extraction 116, and machine learned (ML) extraction 118. Each process uses a different approach to produce an output of zero or more candidates, each paired with a numeric value that represents the relative likelihood that that subsection of text is, in fact, referring to an artifact.

Once all approaches have completed their independent processing, the resultant candidates and their respective likelihoods are combined. In the event where more than one approach suggests the same candidate or when candidates overlap, a predefined factor can be applied to any favored approach(es), and then combined using a likelihood combination function, resulting in the single candidate paired with a combined likelihood. Lastly, from the set of combined candidates, any candidates that have a likelihood that surpasses a sufficient threshold are deemed to be probably referring to an artifact.

One of these approaches in recognizing semantic references can be a linguistic grammar-based extraction approach 116. This approach can employ a predefined set of grammar-based rules along with a dictionary lookup table. The lookup table include a) common terms, b) common phrases and c) common patterns that are typically used to refer to artifacts (for a given language). An example a) term is "Photo". An example b) phrase is "Curriculum Vitae". An example c) pattern is "Xxx . . . Agreement", where "Xxx . . . " represents one or more capitalized words. Each lookup item is paired with a predefined numeric value that represents the likelihood that a matching text is in fact referring to an artifact. For example, the term "resume" has a relatively high likelihood, where the term "letter" has a relatively low likelihood due to ambiguity in meaning in the English language. The process can then attempt to match any subsections of the text with any item in the lookup table. When applicable, match attempts can ignore pluralization, i.e. "photos" is matched with "photo". In the event an exact match cannot be found, an approximate match is sought. Various approximate match techniques can be utilized; these include: Levenshtein distance algorithm, Baeza-Yates-Gonnet algorithm, phonetic algorithms like Soundex, etc. In the event of an approximate match, depending on which algorithm resulted in a match and the goodness of fit, its likelihood can be reduced accordingly.

Within the context of a sentence, artifact references are typically nouns and noun phrases. If a candidate reference, as suggested by a dictionary match, is a part of a sentence, the grammatical structure of that sentence can be considered. In particular, the process can evaluate whether the verb or verb phrase of the sentence further supports the presumption of the dictionary match. If the candidate reference is a subject of the sentence, for example "The document is attached", the process attempts to match the verb root, in this example, "attach", to a predefined set of verb roots that are indicative of verbs that are associated with an artifact reference that is a subject of a sentence. If the candidate reference is an object of the sentence, for example "Please send me the document", the process attempts to match the verb root, in this example, "send", to a different set of predefined verb roots that are indicative of verbs that are associated with an artifact reference that is an object of a sentence. In either case, when a verb root is found to be in accordance with the presumption of a dictionary match, the corresponding likelihood can be increased accordingly.

Another approach in recognizing semantic references can use a statistical model such as a machine learned (ML) method 118. Like the aforementioned linguistic grammar-based extraction process, a ML approach results in zero or more candidate references paired with their likelihoods.

The next step extracts any context related to the artifact reference and subsequently maps any applicable context to criteria that can be used to identify an artifact 128. By analyzing the adjectives and other nouns related the semantic reference, word or phrase descriptors 130 can be identified. For example, in the sentence "Did you complete the applicant form?", the word "applicant" is a descriptor of the artifact "form". Subject matter extraction 132 can be used to analyze the entire communication text, as well as the text of previous related communications, to identify subject matter(s) that may be related to the referenced artifact. Named-Entity Recognition (NER) 134 can also be used to analyze the entire communication text to identify people, organizations and locations that may be related to the communication and therefore related indirectly to the referenced artifact. In addition, coreference resolution 136 can be used to resolve entities, for example pronouns (he, she, they, it, etc.) as well as possessive determiners (my, your, his, her, etc.). For example, in the text "Joe sent his timesheet.", the word "his" is describing the artifact "timesheet", and when resolved, since the possessive determiner "his" can be bound to the noun "Joe", the term "Joe" can be considered a usable element of context. Extending beyond the textual content of the digital communication, a digital communication can have metadata that can be included as context. This can include information about the communicator (name, organization, etc.) and the time of the communication. All of the extracted descriptors, subject matters, entities and metadata correspond directly to keywords, key phrases and attributes that can later be used as criteria.

If in the previous step, the semantic reference was matched with a term or phrase found in the aforementioned dictionary of common terms and phrases, a mapping can suggest potential digital artifact types 138. For example, the term "presentation" can be mapped to Microsoft PowerPoint artifacts, Apple Keynote artifacts, etc. In digital form, these artifact types are often denoted with one or more file name extensions, in this example: "ppt", "pptx", "key", etc. Both the artifact type and file extension can be later used as criteria.

As a part of determining the context of a reference, the sentence, or sentence fragment, that includes the reference can be analyzed to classify its speech act 140. For example, the speech act of a sentence may be assertive, directive, commissive, expressive, or declarative. This speech act classification can be accomplished using a linguistic grammar-based techniques and/or with a machine learned approach. This speech act context can be later used when displaying findings, and assisting the user.

The context and criteria extracted in the previous step can be used to search within the user's digital artifact collection(s). Included in the search can be artifacts that were included with the digital communication, if any. Criteria for finding a match can include: any words and phrases that describe the artifact; any words and phrases that are in a text component or digital file name of the artifact; any names of people, organizations and locations that are mentioned in a text component or digital file name of the artifact; the class(es) or category(ies) of the artifact (for example, contract, letter, invoice, etc.); the type of artifact (for example, document, image, presentation, etc.); the author, contributor or creator of the artifact; etc. The search results can be ranked according to how well the criteria were matched.

When displaying to a user 160, the system can highlight the section(s) of text in a digital communication that correspond to a semantic reference of an artifact. If one or more digital artifacts were found to match the context of the reference, these can be listed in order of rank. In the event a reference is related to a "directive" speech act, and that reference is the object of the directive, and the active root verb suggests that the communicator is requesting a copy of the referenced artifact(s), then the system can provide the user the option to include one or more of the matching artifact in a response communication.

Figure 29A:
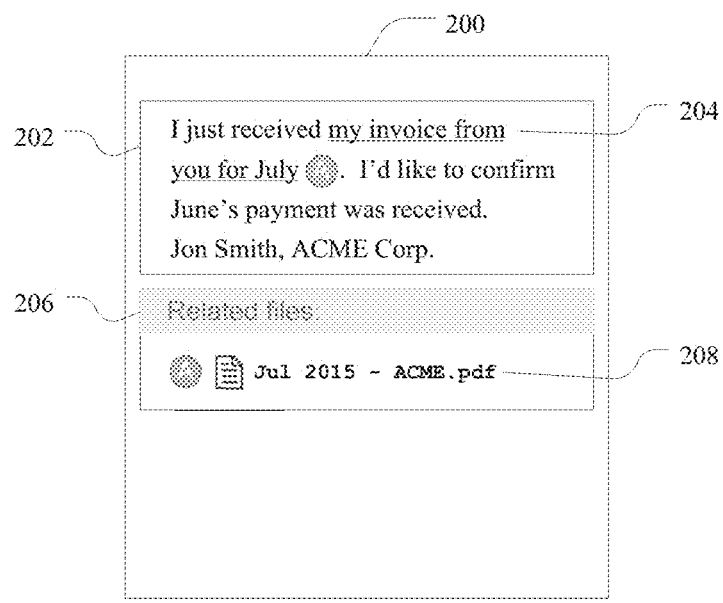
FIGS. 29A, 29B, 29C and 29D are example displays where a user, the recipient of a communication, is assisted in identifying semantic references, and assisting in resolving those references to particular digital artifact(s).

FIG. 29A is an example display 200 which presents the text of a digital communication 202 to a user (in this example, the user being a recipient of the communication). The display highlights the text that makes mention of a particular artifact 204. The display provides a list of matching digital artifacts 206 found within the user's collection(s) of digital artifacts. In this example, one digital artifact 208 was found to match the criteria as extracted from the author's semantic reference to said artifact. The user may choose to view the details of the artifact either by selecting the highlighted section of text 204, or by selecting the item 208 in the list.

Figure 29B:
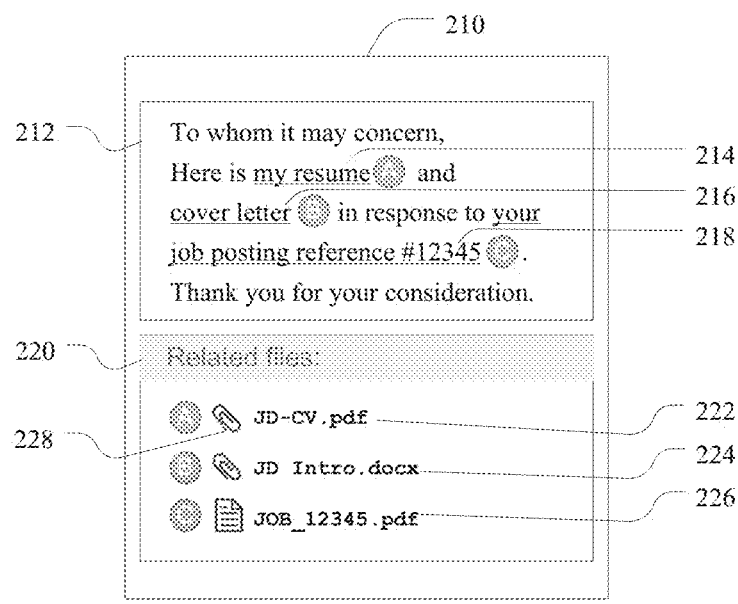

FIG. 29B is an example display 210 which presents the text of a digital communication 212 to a user (in this example, the user is a recipient of the communication). The display highlights the sections of text that make mention of particular three artifacts 214, 216 and 218. The display provides a list of matching digital artifacts 220. The first list item 222 is indicated as corresponding to the first artifact reference 214 within the communication. It is also iconized 228, (in this example, the icon is a paperclip symbol) so as to indicate that that digital artifact is included with this communication. The second list item 224 corresponds with the second highlighted text 216. The third list item 226 corresponds with the third highlighted text 218. The user may choose to view the details of an artifact either by selecting any of the highlighted sections of text 214, 216 or 218, or by selecting any of the items 222, 224 or 226 in the list.

Figure 29C:
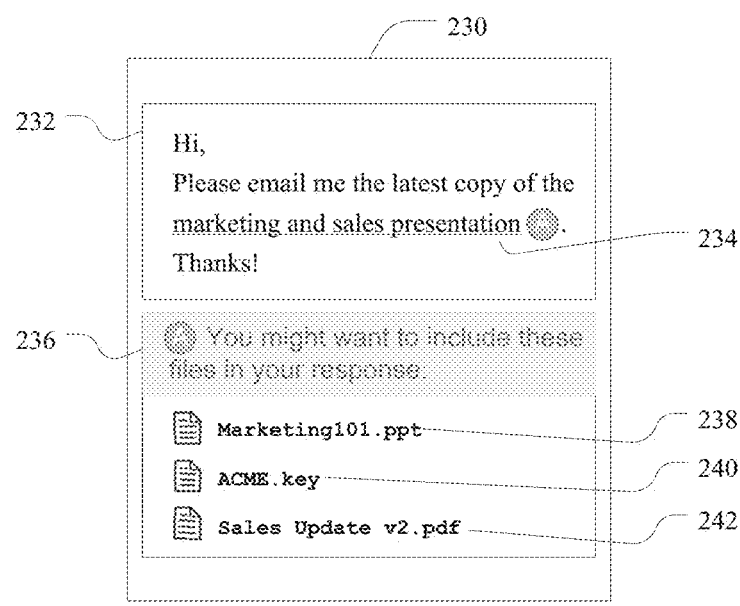

FIG. 29C is an example display 230 which presents the text of a digital communication 232 to a user (in this example, the user is a recipient of the communication). The display highlights a section of text that makes mention of a particular artifact 234. Since the system has detected that the author of the communication has requested a copy of said artifact, the display provides a list of candidate digital artifacts 236. In this example, since there is ambiguity as to which artifact is being requested, three items are listed 238, 240 and 242. These items are the digital artifacts found within the user's collection(s) of digital artifacts that best match the criteria as extracted from the author's semantic reference to said artifact. The user may choose to view the details of an artifact by selecting any of the items and/or select any of the items to include that artifact with their response.

Figure 29D:
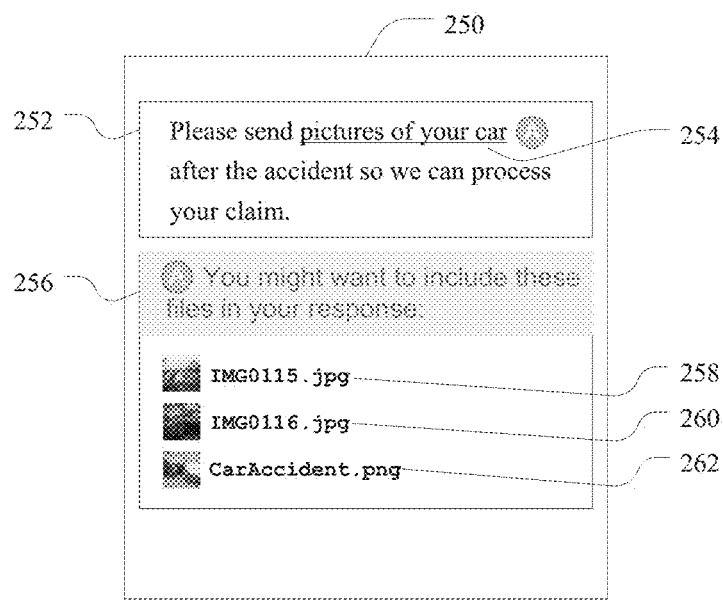

FIG. 29D is an example display 250 which presents the text of a digital communication 252 to a user (in this example, the user is a recipient of the communication). The display highlights a section of text 254 that makes mention of particular artifacts. Since the system has detected that the author of the communication has requested copies of one or more artifacts, the display provides a list of candidate digital artifacts 256. In this example, since multiple artifacts are being requested and there is ambiguity as to which artifact(s) are being requested, three items are listed 258, 260, and 262. These items are the digital artifacts found within the user's collection(s) of artifacts that best match the criteria as extracted from the author's semantic reference to said artifact. The user may choose to view the details of an artifact by selecting any of the items and/or select any of the items to include that artifact with their response.

Figure 30:
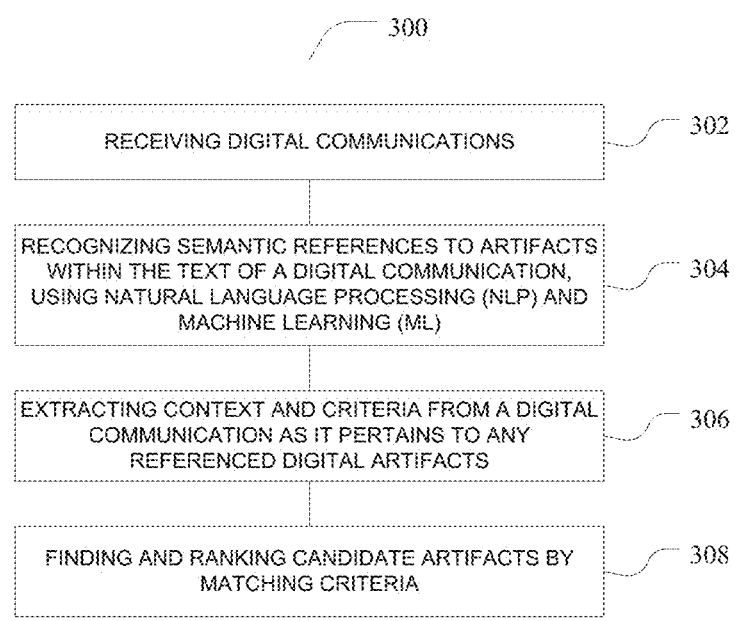
FIG. 30 is a block diagram illustrating an example method for identifying and resolving semantic references to digital artifacts, according to an embodiment.

FIG. 30 is a block diagram illustrating an example method 300 for identifying and resolving semantic references to artifacts within a digital communication, according to an embodiment. The method 300 can include receiving a digital communication (email, chat, text, etc.) 302. A digital communication may or may not contain a semantic reference to an artifact.

As shown in block 304, the method 300 can include recognizing semantic references to artifacts within the text of a digital communication. Recognizing a semantic reference can be attempted using NLP and/or ML approaches, resulting in zero or more candidate references, each paired with their respective likelihoods. Any candidate that has a likelihood that surpasses a sufficient threshold can be deemed to be probably referring to an artifact.

As shown in block 306, the method 300 can include extracting context and criteria from a digital communication as it pertains to any referenced digital artifacts. Extracting context can include analyzing the textual content, as well as the metadata, of the digital communication. Extracted context elements can include: adjectives and nouns associated with the semantic reference, any subject matters of the digital communication, any entities (people, organizations, location, etc.) mentioned in the digital communication, and any entities and time included in the metadata. Any of these extracted context elements can correspond to keyword, key phrase and attributes that can later be used as criteria. Additional criteria, specifically the type of digital artifact, can be derived from the term(s) used to name and/or describe the artifact.

As shown in block 308, the method 300 can include finding and ranking candidate artifacts by matching criteria. Finding and ranking can include searching within any of the user's digital artifact collections. Also comprised in the search can be any artifacts that were included along with the digital communication. Criteria derived in the previous block 306, can be used to search for, and rank based on fittingness of match, any potentially corresponding digital artifacts.

Figure 31:
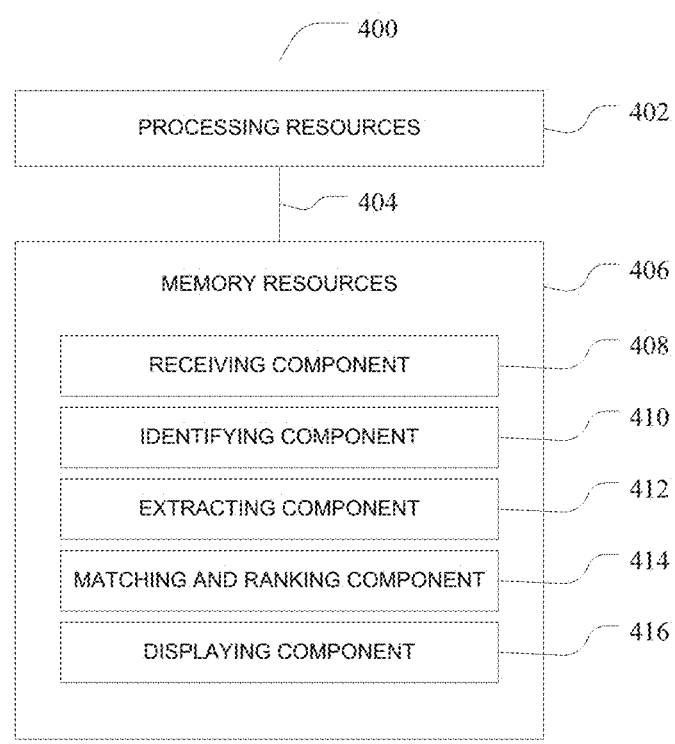
FIG. 31 is a block diagram illustrating system components of an embodiment.

FIG. 31 is a block diagram illustrating an embodiment of a system 400 with processing resources 402 and memory resources 406 for identifying and resolving semantic references to digital artifacts within digital communications, according to an embodiment. The processing and memory resources can be within a single computing device, or can be distributed across multiple computers. A communication link 404 between the memory resources and the processing resources can be a local communication bus (e.g. when on a single computing device), or a computer network (e.g. when distributed across multiple computers). Components 408, 410, 412, 414 and 416 can include machine instructions that, when executed by the processing resources 402, can perform a number of functions to achieve desired outcomes.

A receiving component 408 can include machine instructions that, when executed by the processing resources 402 can receive a digital communication (email, chat, text, etc.).

An identifying component 410 can include machine instructions that, when executed by the processing resources 402 can recognize semantic references to artifacts. Also included in this component can be any accompanying memory resources such as lookup tables and statistical models to support any NLP and ML processing.

An extracting component 412 can include machine instructions that, when executed by the processing resources 402 can extract context as it relates to a recognized reference. Also included in this component can be any accompanying memory resources such as lookup tables and statistical models to support any NLP and ML processing.

A matching and ranking component 414 can include machine instructions that, when executed by the processing resources 402 can search for and rank any potentially corresponding digital artifacts. Also included in this component can be any data stores and indexes which correspond to the user's collection(s) of digital artifacts.

A displaying component 416 can include machine instructions that, when executed by the processing resources 402 can display a digital communication along with zero or more potentially corresponding digital artifacts on a user interface. The display can be controlled by a user by means of a user interface.

Although the present invention has been described with reference to specific features and embodiments thereof, it is evident that various modifications and combinations can be made thereto without departing from the invention. The specification and drawings are, accordingly, to be regarded simply by way of illustration and example only and not to be taken by way of limitation, the scope of the present invention being limited only by the appended claims.

The invention claimed is:

1. A computer implemented method comprising:
receiving an incoming digital communication from a sender;
analyzing a textual body of the incoming digital communication using natural language processing to determine a directive of the digital communication, wherein the directive defines at least an action and one or more persons;
identifying any semantic reference from the textual body of the digital communication, a semantic reference referring to a digital artifacts and being associated with an action;
locating one or more digital artifacts by matching the semantic reference against a collection of digital artifacts;
displaying the identified one or more digital artifacts to a user for a selection;
receiving from the user a selection of at least one of the identified one or more digital artifacts to be included in an outgoing digital communication; and
automatically generating the outgoing digital communication according to the action being defined in the directive, wherein the digital communication comprises the selected one or more digital artifacts, and sending the outgoing digital communication to at least one of the one or more persons defined in the directive.

2. The method of claim 1, wherein the one or more digital artifacts are not specifically identified in the incoming digital communication.

3. The method of claim 1, wherein the one or more digital artifacts are not specifically included in the incoming digital communication.

4. The method of claim 3 wherein the analyzing step further comprises identifying the subject matter of the received digital communication and the role of at least one of the communicators.

5. The method of claim 4 wherein identifying and locating comprises utilizing the subject matter of the received digital communication to identify and locate the one or more digital artifacts.

6. The method of claim 1 wherein identifying includes providing a list of digital artifacts most likely to match a referred to digital artifact to a user to select.

7. The method of claim 6 further comprising utilizing more than one approach to provide the list.

8. The method of claim 7 further comprising storing information about the communication for subsequent analysis of future communications to build a network graph of the inter-relationships between the communicators and the concepts and timing discussed, wherein the other sources of information include the network graph.

9. A system for processing communications comprising:
a communication interface for receiving an incoming digital communication from a sender;
a processing module for analyzing a textual body of the incoming digital communication using natural language processing to determine a directive of the digital communication, wherein the directive defines at least an action and one or more persons; and
an application module for identifying any semantic reference from the textual body of the digital communication, a semantic reference referring to a digital artifacts and being associated with an action; for locating the one or more digital artifacts by matching the semantic reference against a collection of digital artifacts; for displaying the identified one or more digital artifacts to a user for selection; for receiving from a user a selection of at least one of the identified one or more digital artifacts to be included in an outgoing digital communication; and for automatically generating the outgoing digital communication according to the action being defined in the directive, wherein the digital communication comprising the selected one or more digital artifacts and for sending the outgoing digital communication to the one or more of the one or more persons defined in the directive.

10. The system of claim 9 wherein the processing module determine the roles of the communicators.

11. The system of claim 9 wherein the processing module analyzes related sources of information, including related communications, calendar entries, contact information, and/or, third party information about the communicators to determine the context and/or roles.

12. The system of claim 11 further comprising a self-learning system which compiles a database of the contexts by doing this for every communication and adding the topics to the network graph and wherein the processing module utilizes the network graph in order to determine the context of each subsequent communication.

13. The system of claim 12 wherein the application module comprises an assistance engine for one or more of:
assisting with an informal meeting request;
assisting in answering a question;
assisting in contacting a person;
assisting in sending a file; and/or
assisting in the filing of the communication.